(12) United States Patent
Haff et al.

(10) Patent No.: US 7,536,554 B2
(45) Date of Patent: May 19, 2009

(54) THIRD PARTY AUTHENTICATION OF FILES IN DIGITAL SYSTEMS

(76) Inventors: Maurice W. Haff, 9760 Bantry Rd., Easton, MD (US) 21601; Christopher D. Clarke, 2025 Harbour Gates Dr., Apt. 274, Annapolis, MD (US) 21401

( * ) Notice: Subject to any disclaimer, the term of this patent is extended or adjusted under 35 U.S.C. 154(b) by 494 days.

(21) Appl. No.: 10/657,221

(22) Filed: Sep. 9, 2003

(65) Prior Publication Data

US 2004/0049515 A1 Mar. 11, 2004

Related U.S. Application Data

(63) Continuation of application No. 10/167,697, filed on Jun. 13, 2002, now Pat. No. 7,263,528, which is a continuation of application No. 09/694,472, filed on Oct. 24, 2000, now Pat. No. 6,442,571, which is a continuation of application No. 09/190,219, filed on Nov. 13, 1998, now Pat. No. 6,219,669.

(60) Provisional application No. 60/100,962, filed on Sep. 17, 1998, provisional application No. 60/085,427, filed on May 14, 1998, provisional application No. 60/065,533, filed on Nov. 13, 1997.

(51) Int. Cl.
*H04L 9/00* (2006.01)
(52) U.S. Cl. ................................... 713/176
(58) Field of Classification Search .................. None
See application file for complete search history.

(56) References Cited

U.S. PATENT DOCUMENTS

| 3,648,256 | A | 3/1972 | Paine et al. |
|---|---|---|---|
| 4,225,918 | A | 9/1980 | Beadle et al. |
| 4,827,508 | A | 5/1989 | Shear |
| 4,891,785 | A | 1/1990 | Donohoo |
| 4,975,830 | A | 12/1990 | Gerpheide et al. |
| 4,999,806 | A | 3/1991 | Chernow et al. |
| 5,138,712 | A | 8/1992 | Corbin |
| 5,142,622 | A | 8/1992 | Owens |
| 5,166,931 | A | 11/1992 | Riddle |
| 5,210,869 | A | 5/1993 | Williams |
| 5,218,697 | A | 6/1993 | Chung |

(Continued)

OTHER PUBLICATIONS

Neuman et al., Kerberos: An Authentication Service for Computer Networks, http://gost.isi.edu/publications/kerberos-neuman-tso.html, accessed on Apr. 5, 2007, published Sep. 1994.*

(Continued)

*Primary Examiner*—Brandon S Hoffman
(74) *Attorney, Agent, or Firm*—Perkins Coie LLP

(57) ABSTRACT

A file authentication requesting device that stores a computer program for requesting authentication of files in digital systems, the device comprises a confirmation request system that generates a request for a confirmation receipt from a third party authenticator authenticating the attributes of a file; a transferring system that transfers attributes of at least one file to be authenticated to the third party authenticator from the device that requested the confirmation; and a receiving system that receives the confirmation receipt comprising authenticated file attributes, after authentication by the third party authenticator; wherein, at least one file authentication is received from the third party authenticator. Corresponding processing devices, media, systems and methods are also provided.

25 Claims, 25 Drawing Sheets

U.S. PATENT DOCUMENTS

| | | | |
|---|---|---|---|
| 5,260,999 | A | 11/1993 | Wyman |
| 5,263,157 | A | 11/1993 | Janis |
| 5,276,871 | A | 1/1994 | Howarth |
| 5,313,581 | A | 5/1994 | Giokas et al. |
| 5,319,776 | A | 6/1994 | Hile et al. |
| 5,333,152 | A | 7/1994 | Wilber |
| 5,394,521 | A | 2/1995 | Henderson et al. |
| 5,408,333 | A | 4/1995 | Kojima et al. |
| 5,422,999 | A | 6/1995 | Travis et al. |
| 5,423,002 | A | 6/1995 | Hart |
| 5,442,750 | A | 8/1995 | Harriman, Jr. et al. |
| 5,469,545 | A | 11/1995 | Vanbuskirk et al. |
| 5,513,328 | A | 4/1996 | Christofferson |
| 5,553,371 | A | 9/1996 | Uchino et al. |
| 5,555,305 | A | 9/1996 | Robinson et al. |
| 5,555,427 | A | 9/1996 | Aoe et al. |
| 5,564,018 | A | 10/1996 | Flores et al. |
| 5,579,222 | A | 11/1996 | Bains et al. |
| 5,590,334 | A | 12/1996 | Saulpaugh et al. |
| 5,598,279 | A | 1/1997 | Ishii et al. |
| 5,615,336 | A | 3/1997 | Robson et al. |
| 5,619,638 | A | 4/1997 | Duggan et al. |
| 5,623,601 | A | 4/1997 | Vu |
| 5,623,644 | A | 4/1997 | Self et al. |
| 5,630,060 | A | 5/1997 | Tang et al. |
| 5,630,063 | A | 5/1997 | McConnell |
| 5,632,018 | A | 5/1997 | Otorii |
| 5,634,005 | A | 5/1997 | Matsuo |
| 5,634,010 | A | 5/1997 | Ciscon et al. |
| 5,634,012 | A | 5/1997 | Stefik et al. |
| 5,634,057 | A | 5/1997 | Dickinson |
| 5,634,129 | A | 5/1997 | Dickinson |
| 5,638,443 | A | 6/1997 | Stefik et al. |
| 5,652,905 | A | 7/1997 | Shinjo et al. |
| 5,659,794 | A | 8/1997 | Caldarale et al. |
| 5,677,773 | A | 10/1997 | Sakayama et al. |
| 5,689,565 | A * | 11/1997 | Spies et al. .................. 713/189 |
| 5,742,587 | A | 4/1998 | Zornig et al. |
| 5,742,762 | A | 4/1998 | Scholl et al. |
| 5,757,917 | A | 5/1998 | Rose |
| 5,765,152 | A | 6/1998 | Erikson |
| 5,778,368 | A | 7/1998 | Hogan et al. |
| 5,796,841 | A * | 8/1998 | Cordery et al. ............... 380/55 |
| 5,812,666 | A * | 9/1998 | Baker et al. .................. 380/277 |
| 5,813,009 | A | 9/1998 | Johnson et al. |
| 5,917,912 | A | 6/1999 | Ginter et al. |
| 5,956,715 | A | 9/1999 | Glasser et al. |
| 5,987,506 | A | 11/1999 | Carter et al. |
| 6,009,416 | A | 12/1999 | Pintsov |
| 6,029,201 | A | 2/2000 | Neill |
| 6,058,188 | A | 5/2000 | Chandersekaran et al. |
| 6,061,796 | A * | 5/2000 | Chen et al. .................... 726/15 |
| 6,219,669 | B1 | 4/2001 | Haff et al. |

OTHER PUBLICATIONS

Oliphant, "Power Programming: Windows-toUnix Sockets," PC Magazine, Feb. 18, 1997.
Pompili, "Multiple Personalities," PC Magazine, May 27, 1997.
Verthein et al., "Networking Software," PC Magazine, Dec. 17, 1996.
Zagaeski, "Report: Micro Tempus TCS Is High-Function File Transfer Solution That Is More Flexible Than Competitors," http://www.microtempus.com/press/giga_report.html, May 26, 1998, printed Oct. 19, 1998.
"Anyware Technology—Your secure remote access solution!," http://www.anywaretechnology.com/support/techfaqs.html, printed Oct. 19, 1998.
"Battle Group Information Exchange System (BGIXS) Upgrade Page," http://www.asclab.com/bgixs/bgixs2.html, printed Oct. 19, 1998.
"CA-XCOM®: Enterprise-Wide Data Transport Solution," Computer Associates® Brochure, Copyright 1997-1998.
"CA-XCOM for Windows95 Product Information," http://www.cai.com/products/xcom_win_95.htm, printed Oct. 19, 1998.
"CA-XCOM for Windows95-Release 3.0," http://www.cai.com/products/announcements/xcom_win_95.htm, printed Oct. 1998.
"Client-Server," http://www.digicorp.co.uk/rucksack/sc.html, printed Oct. 19, 1998.
"Computer Dealer News," http://www.plesman.com/archive/cdn/97YCD46C.htm, printed Oct. 19, 1998.
"Connect: Direct, "http://www.stercomm.com/pdsv/ploc/conn/drec/index.html, printed Oct. 19, 1998.
"Connect: Direct for the Web," http://.www.stercomm.com/pdsv/ploc/conn/drec/cd-web.html, printed Oct. 19, 1998.
"Connect: Direct for Windows 95," http://www.stercomm.com/pdsv/ploc/conn/drec/cd-win 95.html, printed Oct. 19, 1998.
"Connect: Direct Product Summary," http://www.stercomm.com/pdsv/ploc/conn/drec/psum-01.html, printed Oct. 19, 1998.
"DOWNLOAD.COM—Cyberpaste," http://www.download.com/PC/Result/TitleDetail/0,4,0-32500,1000.html?st.dl.results.list.tdtl, printed Sep. 16, 1998.
"DOWNLOAD.COM—DragDrop FTP," http://www.download.com/PC/Result/TitleDetail/0,4,0-56080,1000.html?st.dl.results.list.tdtl, printed Sep. 16, 1998.
"DOWNLOAD.COM—DropChute+," http://www.download.com/PC/Result/TitleDetail/0,4,0-50652,1000.html?st.dl.results.list.tdtl, printed Sep. 16, 1998.
"DOWNLOAD.COM—Hotline Client," http://www.download.com/PC/Result/TitleDteail/0,4,0-48096,1000.html?st.dl.results.tdtl, printed Sep. 16, 1998.
"DOWNLOAD.COM—Hotline Server(Power PC)," http://www.download.com/Mac/Result/TitleDetail/0,4,0-45026,1000 html?st.dl.results.list.tdtl,printed Sep. 16, 1998.
"DOWNLOAD.COM—Secure Communicator," http://www.download.com/PC/Result/TitleDetail/0,4,0-17906,1000.html?st.dl.results.list.tdtl,printed Sep. 16, 1998.
"DOWNLOAD.COM—SimpleSend," http://www.download.com/PC/Result/TitleDetail/0,4,0-24662,1000.html?st.dl.results.list.tdtl, printed Sep. 16, 1998.
"DOWNLOAD.COM—TeleContact," http://www.download.com/Mac/Result/TitleDetail/0,4,0-34932,1000.html?st.dl.results.list.tdtl, printed Sep. 16, 1998.
"DropChute+: Frequently Asked General Questions," http://www.hilgraeve.com/dcpfaqps.html, printed Sep. 16, 1998.
"DropChute+: Frequently Asked Technical Questions," http://www.hilgraeve: Frequently Asked Technical Questions, http://www.hilgraeve.com/dcpfaqcs.html, printed Sep. 16, 1998.
"DropChute+: Personal File Delivery Software," http://www.hilgraeve.com/dropchute.html, printed Sep. 16, 1998.
"EverLink™ Suite," http://www.anywaretechnology.com/products/everlink/overview.html, printed Oct. 19, 1998.
"Focus TeleContact," http://www.focusworks.com/TC.html, printed Sep. 25, 1998.
"Hilgraeve Announces DropChute Enterprise," printed Jan. 1999.
"Home Page: Products-CyberPaste," http://www.dsdcorp.com/cyberpaste.htm, printed Sep. 25, 1998.
"MicroTempus," http://www.citrix.co.uk/cba/alliances/mtempus.html, printed Oct. 19, 1998.
"News Release: Harbinger and Micro Tempus Team Up For Electronic Commerce Solutions and Services," http://www.microtempus.com/press/harbinger.html, printed Oct. 19, 1998.
NIWOT Frequently Asked Questions: Gigabyte Express for Macintosh, http://www.niwot.com/faq.htm, printed Oct. 19, 1998.
"NIWOT Gigabyte Express Data Sheet," http://www.niwot.com/dsgbx.htm, printed Oct. 19, 1998.
"QEC²" QEC Technology Corporation Brochure, Copyright © 1995-1997 (as revised Nov. 1997 or later).
"Rucksack-an overview," http://www.digicorp.co.uk/rucksack/rcksck_lit.htm, printed Oct. 19, 1998.
"SimpleSend," http://www.mercury-group.com/ssinfo.html, printed Sep. 25, 1998.
"StarBurst Communications—Products," http://www.starburstcom.com/overview.htm, printed Oct. 19, 1998.

"TDM Utility Software Products-PeerLink," http://www.tdminc.com/peerlink.html, printed Oct. 19, 1998.

"TDM Utility Software Products-PeerSync," http://www.tdminc.com/peersync.html, printed Oct. 19, 1998.

"ThorComm WebSite," http://209.136.106.52/thorcomm/, printed Oct. 19, 1998.

User's Manual "DropChute+: Personal File Delivery Software," printed Sep. 16, 1998.

User's Manual "Gigabyte Express™ for windows," Copyright 1997-1998, printed Jun. 1998.

Doolittle, Sean "The Scoop On File-Sharing Services, Get By With A Little Help From Your Peers," Dec. 2000, V.II, Issue 12, pp. 1-6 (pp. 30-33 in print issue).

J. Postel et al.(incorrectly cited as J. Postal et al.), "File Transfer Protocol (FTP)", IETF Request for Comments (RFC) 959, Oct. 1985, pp. 1-69.

\* cited by examiner

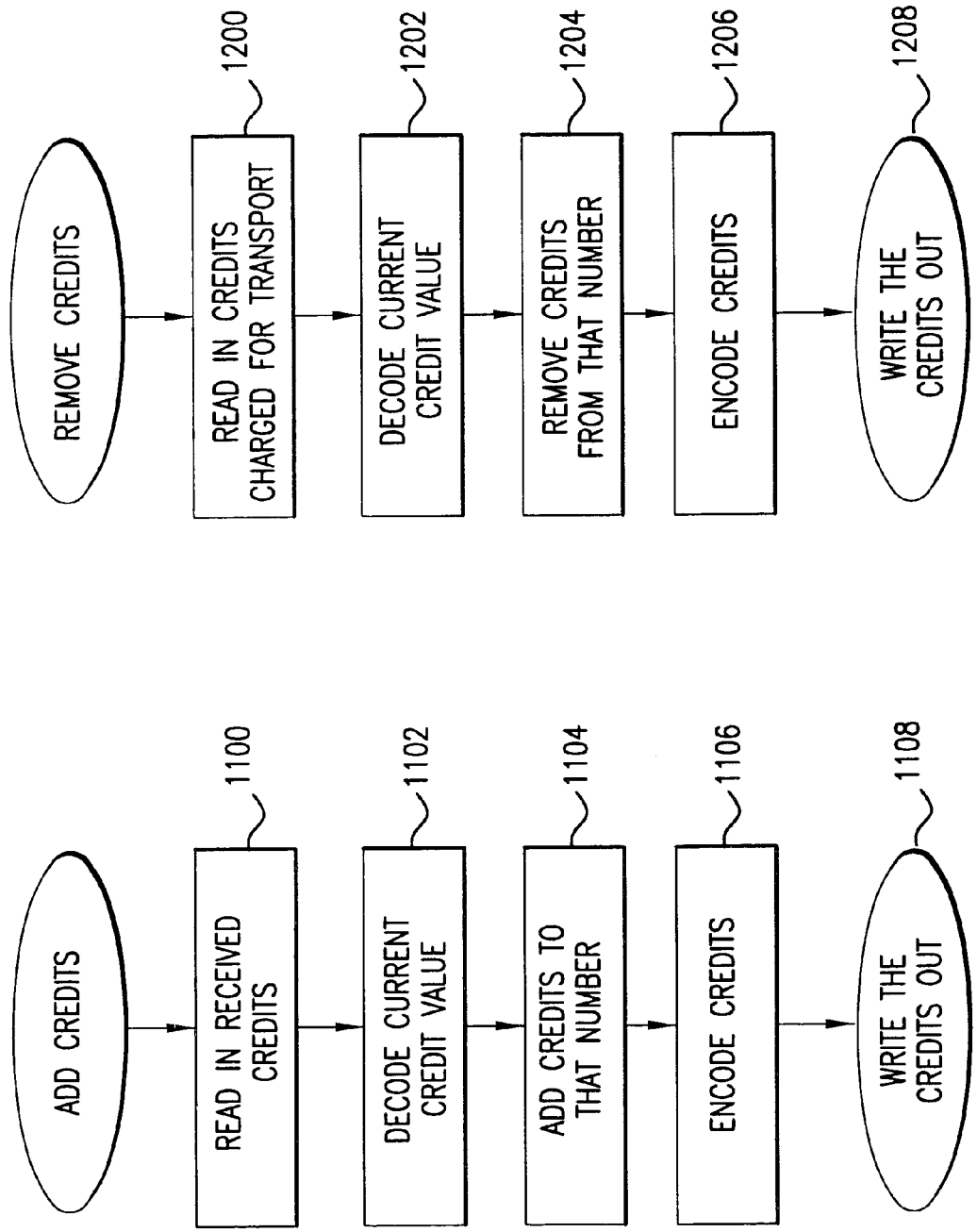

| | | | | | | | |
|---|---|---|---|---|---|---|---|
| ALL | SEND | RECEIVE | FAILED | READING | SETUP | PRINT | |
| TO/FROM | | DATE | TIME | TYPE | STATUS | | |
| CTX NOTEBOOK | | 09/21/1997 | 12:12:10 | RECEIVE | COMPLETED | | R |
| CTX NOTEBOOK | | 10/07/1997 | 15:05:10 | RECEIVE | COMPLETED | | R |
| CTX NOTEBOOK | | 10/07/1997 | 15:13:40 | RECEIVE | COMPLETED | | R |
| CTX NET | | 10/07/1997 | 16:02:43 | SEND | COMPLETED | | |
| CTX NOTEBOOK | | 10/07/1997 | 16:10:00 | RECEIVE | COMPLETED | | R |
| CTX NOTEBOOK | | 10/07/1997 | 16:23:20 | RECEIVE | COMPLETED | | R |

DECRYPT — 21          22 — CLOSE LOG

FIG.15

PACKET PROPERTIES

PACKET NAME:
4D2615B6.ZIP

FILE LIST:
WINDOWS\DESKTOP\6-12-97.DOC

DESCRIPTION/INSTRUCTIONS:
THESE FILES WERE COMPRESSED ON 9/10/1997 AT 16:23

CANCEL — 26          VIEW RECEIPT — 27

FIG.16

THIRD PARTY AUTHENTICATION OF FILES IN DIGITAL SYSTEMS

CROSS REFERENCES TO RELATED APPLICATIONS

This application is a continuation of U.S. patent application Ser. No. 10/167,697, filed Jun. 13, 2002, entitled "File Transfer System", which is now U.S. Pat. No. 7,263,528, issued Aug. 28, 2007, which is a continuation of U.S. patent application Ser. No. 09/694,472, entitled "Methods and Apparatus for Secure Electronic, Certified, Restricted Delivery Mail Systems", filed Oct. 24, 2000, which is now U.S. Pat. No. 6,442,571, issued Aug. 27, 2002; which is a continuation of U.S. patent application Ser. No. 09/190,219, entitled "File Transfer System Using Dynamically Assigned Ports", filed Nov. 13, 1998, which is now U.S. Pat. No. 6,219,669, issued Apr. 17, 2001; the disclosures of which, including appendices thereof, are expressly incorporated herein by reference in their entireties. This application also claims the benefit of U.S. Provisional Patent Application No. 60/065,533, in the names of Maurice Haff et al., entitled "File Transfer System For Direct Transfer Between Computers", filed on Nov. 13, 1997; U.S. Provisional Patent Application No. 60/085,427, in the names of Maurice Haff et al., entitled "File Transfer System", filed on May 14, 1998; and U.S. Provisional Application No. 60/100,962, in the names of Maurice Haff et al., entitled "File Transfer System", filed Sep. 17, 1998; the disclosures of which, including appendices thereof, are expressly incorporated herein by reference in their entireties.

A portion of the disclosure of this patent document contains material that is subject to copyright protection. The copyright owner has no objection to the facsimile reproduction by anyone of the patent document or the patent disclosure, as it appears in the Patent and Trademark Office patent file records, but otherwise reserves all copyright rights whatsoever.

REFERENCE TO COMPUTER PROGRAM LISTING APPENDICES

Computer program listing appendices on compact disc-recordable (CD-R), containing Appendices A-D that corresponds to the program listings discussed below, are filled herewith, in accordance with 37 C.F.R. § 1.52(e). These computer program listing appendices are incorporated herein by reference in their entirety, in accordance with 37 C.F.R. § 1.77(b)(4). The below referenced files were created on Jan. 8, 2009 to correspond to Appendices A-D, as originally submitted on microfiche. The files on CD-R are identified as follows:

| Name | Size | Type |
|---|---|---|
| Appendix A.txt | 462,201 bytes | Text Document |
| Appendix B.txt | 211,699 bytes | Text Document |
| Appendix C.txt | 73,665 bytes | Text Document |
| Appendix D.txt | 42,587 bytes | Text Document |

BACKGROUND OF THE INVENTION

1. Field of the Invention

The present invention relates to transferring computer files electronically from one location to another, and more particularly to electronic transfer of computer files directly between two or more computers or computing devices.

2. Background Information

Expedited delivery of documents has for generations been of great concern to people and of great importance to their business interests. Methods of effecting expedited document delivery have progressed to include same day/next day physical delivery using international and domestic airways and roadways, as well as electronic delivery using interconnected networks of computers and telecommunications equipment, worldwide. Complex logistics systems have been erected by both government and commercial enterprises to effect relatively secure physical delivery of documents from the sender to the recipient. Examples include overnight express mail delivery offered by the U.S. Postal Service and express delivery service provided by private companies such as Federal Express, United Parcel Service, and DHL. Charges for delivery services rendered are typically on fixed fee basis (per delivery), with payment made at the time the service is performed, or made via a pre arranged account with the service provider or a third party credit provider (e.g. VISA or Master Card).

The complexity of these systems and the physical resources mobilized to support the expedited transfer service are relatively costly, with the costs being passed on to the service user. Extensive interconnected networks of computers and telecommunications equipment have been erected with the intent to lower the cost of communication, as well as to further expedite the transfer of information between sender and recipient. To an extent, the evolution from physical delivery to electronic delivery of documents has been successful as evidenced by the growth in the use of personal computers (PCs), the Internet and private intranets and extranets, albeit at the expense of the relative security of the document transfer. Examples of electronic transfer mechanisms in use across computer networks include electronic mail (e-mail) and file transfer protocol (FTP), both widely employed on the Internet. Examples of electronic transfer mechanisms in use across the public switched telephone network (PSTN) include facsimile transmissions, as well as file transfers using modems and various embodiments of computer programs enabling data communications between computers.

Hybrid systems are also employed to provide remote access to files stored on network servers. These hybrid systems typically employ specialized communications servers connected on a local area network and interconnected to a counterpart communications server on another local area network through a public network such as the Internet. Alternatively, a remote PC may be permitted to login to a communications server using a dial-up connection through the PSTN. Often referred to as "virtual private networks" or VPNs, these hybrid systems typically employ encrypting techniques to create relatively secure data packets for transmission through client-server connections across public networks. An example of a VPN product is Alta Vista, a software product available from Digital Equipment Corporation.

The approaches, as embodied in the physical and the electronic document delivery systems in use today, exhibit a number of shortcomings. While being relatively secure, slower express mail and delivery services are more costly to the sender than more immediate delivery electronic alternatives. With electronic transfers across networks, a more immediate delivery of documents, data files, images, and drawings can be accomplished. However, these methods generally employ intermediary computers in the form of e-mail servers, FTP servers, or Web servers. These intermediary computers reduce the relative security and timeliness of the transfers effected because neither the sender nor the recipient controls the intermediary server. Moreover, the intermediary servers themselves require significant administration and usually require login procedures and passwords in an attempt to overcome security issues, albeit at the expense of user convenience and system complexity. Further, these intermediary computers represent concentrated points of possible failure, as well as communication "bottlenecks" that set capacity limits for the collective number and size of files transferred.

Examples of an approach employing e-mail servers are cc:Mail available from Lotus Development Company, and Microsoft Mail available from Microsoft Corporation. An example of a system employing FTP servers and Web servers for IP networks is Netscape Navigator available from Netscape Communications Corporation. Each of these systems requires intermediary computers that function as servers to store text messages or document files for later retrieval by the intended recipient. All of these systems require user login to a server and downloading of files. Thus, direct transfer of a specific file from a sending PC to a specific recipient at a receiving PC is not enabled by these systems, nor is the simultaneous exchange of files between multiple computers.

A variation of the e-mail concept is manifested in a recently introduced file transfer service called "e-Parcel" available over the Internet from Mitsubishi America. "e-Parcel" is a pay subscription service employing client-server connections through the Internet. A similar system called "NetDox" is available from NetDox, Inc. Both of these products employ client software to provide automatic login to a mediating server that forwards a transferred file to a registered recipient when the recipient logs in to the mediating server. E-mail addresses are used to create unique identifiers for each registered user for file routing and billing purposes. However, direct transfer of a file from the sender to the recipient without login to the forwarding server is not possible in server-based mediated systems such as e-Parcel or NetDox. Another drawback of server-based systems is that they are capacity limited in terms of the number of file transmissions that can be processed simultaneously, and the magnitude of the files that can be collectively stored during any given time period. Server capacity must be increased proportionally, at significant cost, as the number of users and system use increases. Another limitation of store and forward (mediated transfer) servers is that concentration of transmitted files represents a system-level point of failure that increases both security and reliability risks.

In any document delivery system, physical or electronic, a manageable method of obtaining payment for the services rendered to the user is a critical element for success. In physical delivery systems for expedited service, payments are often made for charges to a billing account accumulated monthly, with the account numbers being recorded on an "airbill" that accompanies the document package. A record of the transaction must be captured, usually by a manual process, and entered into a computer accounting system. The United States Postal Service (USPS), as well as other national postal systems, have long offered mechanical postage meters for placing "metered stamps" on envelopes to be sent through the mail. These mechanical postage meters must be taken by the user to a "post office" to be reset. This enables a postal service to capture payment for future services to be delivered.

A variation of the traditional postal meter is a newer technology electronic postage meter offered by Pitney Bowes, Inc., called "PERSONAL POST OFFICE"®. The electronic postage meter can be reset over telephone lines with charges made to a Pitney Bowes "POSTAGE BY PHONE"® account. Pitney Bowes also offers a "Post Office for the PC" product that enables "metered" post marks to be printed onto envelopes using a personal computer printer. A peripheral device attached to the personal computer serves as the postage repository, with postage downloaded via modem over telephone lines.

Payment for the service provided by e-Parcel is via a prearranged flat rate monthly charge, with the charge being determined upon registration based upon projected use and transmission file size. An alternative payment plan, pay upon transfer service, has been advertised and charges a fee for each file sent through an e-Parcel server. Payment for the service provided by NetDox, Inc. is via NetDox server software licenses.

United Parcel Service, Inc. (UPS) has announced a mediated electronic document file delivery service based upon the NetDox product, and also based on another store and forward server based product called "Posta", available from Tumbleweed Software, Inc. The UPS system is represented to be an electronic document delivery service for which the user establishes a billing account that will be charged for each document file sent through the UPS servers.

Facsimile transmissions across the PSTN, compliant with CCIPP Group 3 facsimile standards, are relatively direct, immediate, and secure from third party interception. However, facsimile transmissions can pose a multitude of transmission management and processing problems for both the sender and recipient. For facsimile transmissions, the "service providers" are the local and long distance telephone companies that charge for the connect time required to send a fax.

Examples of devices using CCITT Group 3 facsimile transmission standards are widely deployed fax machines available from a multitude of manufacturers, such as Hewlett Packard Corporation and Panasonic Corporation. Additional examples of devices employing the Group 3 facsimile standard are the widely deployed PC fax modems available from manufacturers such as US Robotics Corporation. Both fax machines and fax modems communicate over the PSTN. An emerging technology is transmission of fax images over the Internet. While fax devices enable direct transmission of a specific document image from a sender to a specific recipient, the transmissions are not in the original file format of the document transmitted and typically suffer degraded visual quality. PC fax transmissions result in very large file sizes driving requirements for large storage capacity.

Unlike facsimile image transmissions, electronic file transfers across networks or through the PSTN using modems can render document files to the recipient in native format, whether text, graphics, drawings, video, or sound. Such files may contain large format drawings or large page count documents. Unlike e-mail with attachment files, electronic file transfers generally do not suffer problems with unpredictable delivery, third party mail server security, nor attachment file encoding compatibility. However, mediated file transfer using client/server communication across wide area networks typically requires login to a network server, and can pose security risks when access is permitted for remote users or an organizationally unrelated third party.

File transfers through the PSTN using modems and the prior communication architectures with accompanying computer programs usually require user attendance to effect the transfer between PCs. Alternatively, remote control of one PC from another PC with attendant security risks is allowed. Thus, all of the mechanisms in the prior art for effecting electronic file transfer, whether across the Internet, private intranets or extranets, or through the PSTN, require a multitude of process steps and a significant degree of user training.

An example of an approach designed to provide user access to document files across a network is described in U.S. Pat.

No. 5,634,057. This patent describes groupware, in which multiple users logged on to a network can interactively collaborate regarding various aspects of documents such as form and content. Typically, groupware suffers from its own complexity of use and does not enable direct transmission of a specific file from one PC to another PC, or a simultaneous exchange with multiple PCs.

Another example of an approach accomplishing file transfers directly from a sending PC to a receiving PC through the PSTN, and in some instances through the Internet, is a class of products described as "remoteware". Within this category, specific products such as "pcAnywhere", available from Symantec Corporation, enable a user to login from one computer to another computer and effectively take control of the operation and stored files of the computer onto which login was accomplished. However, direct transfer of files without the third party security risk of login and control is not provided. Additionally, products such as "DynaComm", available from FutureSoft Engineering, Inc., are designed to provide dial-up terminal access to servers and mainframe computers across the PSTN. Such products are also typically capable of direct PC to PC transfer of files, provided a PC operator is available and ready at both the sending and receiving PC to setup the parameters and conditions under which the transfer will be made.

Another example of an approach that enables transmission of a single file from one PC to another PC interconnected to a Transmission Control Protocol/Internet Protocol (TCP/IP) network is a demonstration computer program called "Wormhole", available over the Internet from Microsoft Corporation. The purpose of this freeware computer program is to demonstrate how a socket data structure functions under the Microsoft Windows operating system. This demonstration program is capable of sending only one file to only one PC at a manually entered IP address. No restrictions can be placed on when or where files can be transmitted, nor from whom they are received. Simultaneous exchange of files with more than one PC is not enabled nor suggested. Furthermore, no PSTN communication and no error checking or verification of the file transfer is provided. Moreover, no indication of where files originate from is provided. In addition, no communication or file controls are enabled. Also, it is not possible to request a file from a PC operating the Wormhole computer program, nor is any form of file transport security provided.

Another example of an approach that enables direct PC to PC communication through the PSTN, developed by the current applicant, is the AEGIS Document Imaging System (ADIS). In ADIS, document management and communication functions are integrated to provide a system for creating a virtual PC network interconnected through the PSTN. In addition to imaging capable PC equipment, ADIS requires specific communication hardware (e.g., SatisFAXtion 400 fax modem developed by Intel Corporation, available from Pure Data, Ltd., Ontario, Canada), and uses a file transfer mechanism built into the SatisFAXtion board controlled by the ADIS computer program. No capability for direct file transfer across the PSTN using widely deployed standard Hayes compatible data modems, or across a TCP/IP network, is included in ADIS. Moreover, file requests can be made from one ADIS station by another ADIS station, but file requests can not be restricted to a specific station.

Another drawback of these conventional systems is that polling of a remote computer, when such capability is present, occurs serially. Thus, a long time is required to receive many files from many different destinations, particularly if one of the destinations is busy, causing the polling computer to repeatedly attempt to contact the destination before ultimately timing out.

Another example of a known file transfer system is Drop-Chute+, available from Hilgraeve, Inc. of Monroe Mich. Drop Chute+ utilizes a single port, thus limiting communication to one other computer at one time. DropChute+ cannot communicate simultaneously (transfer files in parallel) with one or more other computers. Moreover, with DropChute+ all transfers and commands take place on a single port. If more than one event is to occur, all events are multiplexed through the single port. Furthermore, if a user wants to send a file to a group of destinations, there is simply no way to do it under DropChute+.

Thus, there is a need for a system to provide immediate and secure assured delivery of documents from sender to recipient which retains the positive aspects of the prior art, but does not suffer from its shortcomings.

SUMMARY OF THE INVENTION

In view of the foregoing, in one aspect the present invention is directed to providing a file authentication requesting device that stores a computer program for requesting authentication of files in digital systems, the device comprising: a confirmation request system that generates a request for a confirmation receipt from a third party authenticator authenticating the attributes of a file; a transferring system that transfers attributes of at least one file to be authenticated to the third party authenticator from the device that requested the confirmation; and a receiving system that receives the confirmation receipt comprising authenticated file attributes, after authentication by the third party authenticator; wherein, at least one file authentication is received from the third party authenticator. The at least one file to be authenticated may be received by the device as a file transfer from another device. An identification of at least one of the device or user of the device may be transferred along with attributes of the at least one file to be authenticated. The authentication may comprise digitally signing the confirmation receipt. The authentication may comprise a unique digital characterization of file attributes by a postal authority.

In another aspect, the invention provides a file authentication processing device that stores a computer program for processing requests for authentication of files in digital systems, the device comprising: a receiving system that transfers attributes of at least one file to be authenticated to the third party authenticator from the device that requested the confirmation; a processing system that processes a confirmation receipt, the processing comprising a unique digital characterization of the file attributes, assuring at least in part tampering and modification detection; and a sending system that sends the confirmation receipt comprising authenticated file attributes to the requesting device, after processing by the third party authenticator; wherein, at least one file is authenticated by the third party authenticator. An identification of at least one of the requesting device or user of the requesting device may be transferred along with attributes of the at least one file to be authenticated. The unique digital characterization may comprise digitally signing at least the file attributes or the confirmation receipt. The confirmation receipt may incorporate at least the date and time of authentication, and an identification of at least the requesting device. The unique digital characterization of file attributes may comprise authentication by a postal authority.

In another aspect the invention provides a file authentication system comprising: an originating file authentication device originating a request for a confirmation receipt from a third party authenticator, and transferring attributes of at least one file to be authenticated to the third party authenticator; a confirmation request processing device for processing a confirmation receipt by the third party authenticator, the processing comprising a unique digital characterization of the file attributes, assuring at least in part tampering and modification detection; a transferring device for transferring the confirmation receipt comprising authenticated file attributes, after processing by the third party authenticator, to the device that requested confirmation; wherein, the third party authenticator authenticates the attributes of the at least one file as requested by the device. An identification of at least one of the requesting device or user of the requesting device may be transferred along with attributes of the at least one file to be authenticated. The unique digital characterization may comprise digitally signing at least the file attributes or the confirmation receipt. The confirmation receipt may incorporate at least the date and time of authentication, and an identification of at least the requesting device. The unique digital characterization of file attributes may comprise authentication by a postal authority.

In another aspect, the ivention provides a computer readable medium that stores a computer program for authentication of files in digital systems, the medium comprising: a transferring source code segment that transfers attributes of at least one file to be authenticated to the third party authenticator from the device that requested the confirmation; a processing source code segment that processes a confirmation receipt, the processing comprising a unique digital characterization of the file attributes, assuring at least in part tampering and modification detection; a sending source code segment that sends the confirmation receipt comprising authenticated file attributes to the requesting device, after processing by the third party authenticator; wherein, at least one file is authenticated by the third party authenticator. An identification of at one of least the requesting device or user of the requesting device may be transferred along with attributes of the at least one file to be authenticated. The unique digital characterization may comprise digitally signing at least the file attributes or the confirmation receipt. The confirmation receipt incorporates at least the date and time of authentication, and an identification of at least the requesting device. The unique digital characterization of file attributes may comprise authentication by a postal authority.

In another aspect the invention provides a computer readable medium that stores a computer program for requesting authentication of files in digital systems, the medium comprising: a confirmation request source code segment that generates a request by a device for a confirmation receipt from a third party authenticator authenticating the attributes of a file; a transferring source code segment that transfers attributes of at least one file to be authenticated to the third party authenticator from the device that requested the confirmation; a receiving source code segment that receives the confirmation receipt comprising authenticated file attributes, after processing by the third party authenticator; wherein, at least one file authentication is received from the third party authenticator. The at least one file to be authenticated may be received by the device as a file transfer from another device. An identification of at least the device or user of the device may be transferred along with attributes of the at least one file to be authenticated. The unique digital characterization may comprise digitally signing the confirmation receipt. The unique digital characterization of file attributes may comprise authentication by a postal authority.

In another embodiment, the invention provides a method for authenticating files in digital systems, the method comprising: requesting a confirmation receipt from a third party authenticator by a device, transferring attributes of the at least one file to be authenticated to the third party authenticator by the device that requested the confirmation; processing a confirmation receipt by the third party authenticator, the processing comprising a unique digital characterization of the file attributes, assuring at least in part tampering and modification detection; transferring the confirmation receipt comprising authenticated file attributes, after processing by the third party authenticator, to the device that requested confirmation; wherein the third party authenticator authenticates the attributes of the at least one file as requested by the device. The at least one file to be authenticated my be received by the device as a file transfer from another device. An identification of at least the device or user of the device may be transferred along with attributes of the at least one file to be authenticated. The unique digital characterization may comprise digitally signing the confirmation receipt. The confirmation receipt may incorporate at least the date and time of authentication, and an identification of at least the requesting device. The unique digital characterization of file attributes may comprise authentication by a postal authority.

BRIEF DESCRIPTION OF THE DRAWINGS

The present invention is further described in the detailed description which follows, by reference to the noted drawings by way of non-limiting examples of preferred embodiments of the present invention, in which like reference numerals represent similar parts throughout several views of the drawings, and in which:

FIG. 11 is a flow diagram of exemplary logic of an add credits module which increments any remaining credits by the amount of the new authorized credits, according to an aspect of the present invention;

FIG. 12 is a flow diagram of exemplary logic of a remove credits module which decreases credits by the amount of the transfer cost, according to an aspect of the present invention;

FIG. 15 shows an example of an event log window which records file transmission and receipt events, according to an aspect of the present invention;

FIG. 16 illustrates an example of an event properties window that shows the properties and listed files of events listed in the event log file, according to an aspect of the present invention;

BRIEF DESCRIPTION OF APPENDICES

Appendix A is a source code listing of Tool Book script modules that are an exemplary implementation for generating the user interface for the file transfer system of the present invention, the scripts modules being coded in Tool Book (available from Asymetrix Corporation of Bellevue, Wash.);

Appendix B is a C++ source code listing of exemplary dynamic link libraries that implement the destination book features of the file transfer system of the present invention;

Appendix C is a C++ source code listing of exemplary dynamic link libraries that handle the file transferring functions of the file transfer system of the present invention; and Appendix D is a C++ source code listing of exemplary dynamic link libraries that implement the logging and credit features of the file transfer system of the present invention.

DETAILED DESCRIPTION OF PREFERRED EMBODIMENTS OF THE INVENTION

Figure 1:
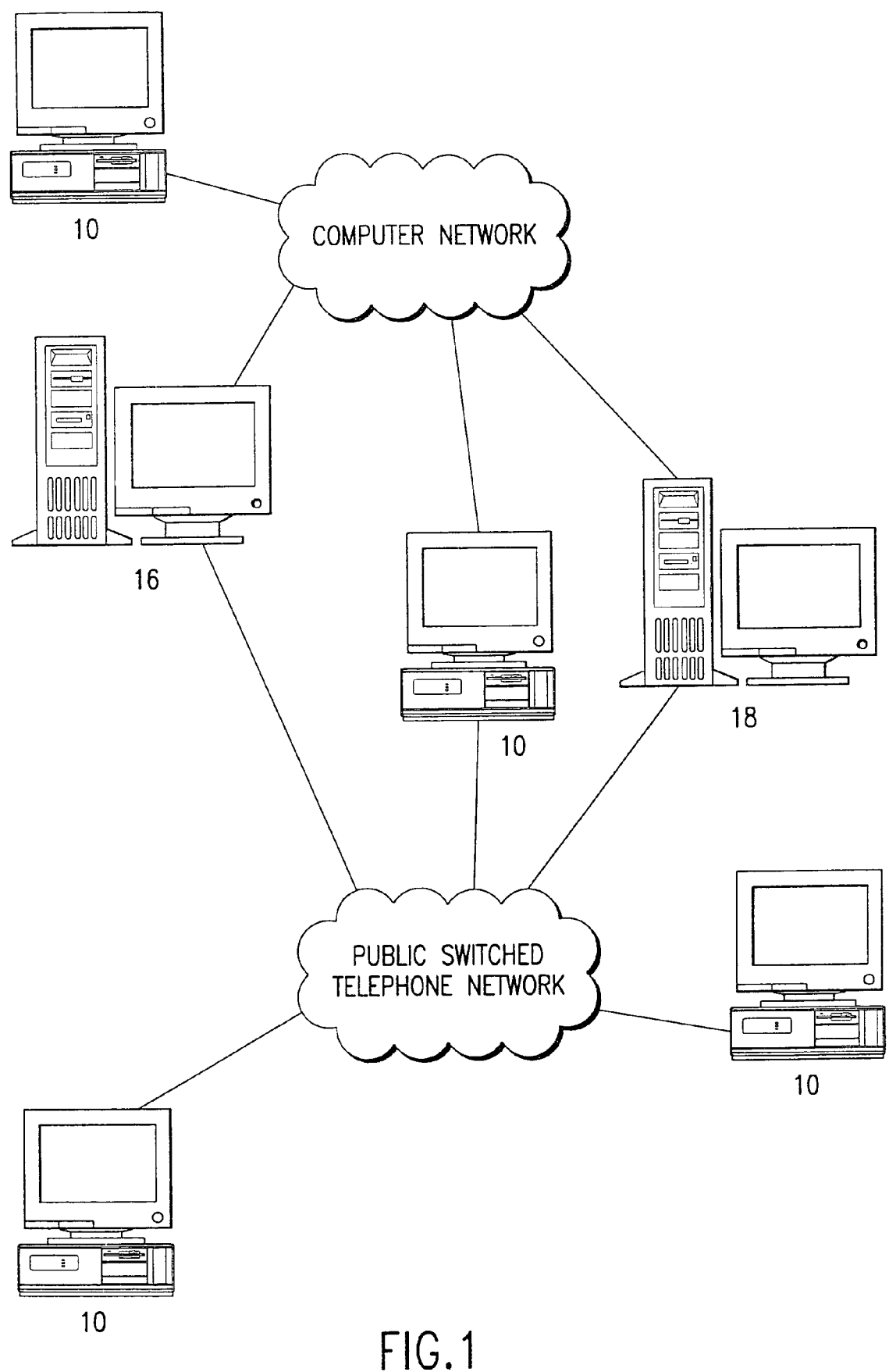
FIG. 1 is a schematic block diagram illustrating a system architecture with a limited number of personal computers connected to various communication pathways, according to an aspect of the present invention.

Referring now to FIG. 1, there is shown a schematic illustration of one preferred embodiment of the present invention illustrating a system architecture with a limited number of personal computers (PCs) 10 connected to communications pathways, even though any number of PCs 10 may be connected without limitation. FIG. 1 shows that the PCs 10 may be connected to and may use one communications pathway (e.g., the Internet), another communications pathway (e.g., the public switched telephone network PSTN), or more than one communications pathway (e.g., Internet and PSTN) simultaneously. The preferred embodiment of FIG. 1 includes multiple PCs 10, without limitation as to the maximum number of PCs 10. Although each PC 10 is shown to be connected to the Internet, and/or the PSTN, alternative communications pathways may be employed, such as private intranets and extranets.

Each PC 10 is preferably, but is not limited to, an "IBM compatible" x86 or Pentium class machine, connected to a communications pathway. However, other computing devices, such as hand held computers, television set top boxes, mobile telephones, wearable computers, wireless computing devices, or any other device capable of connecting to a network and utilizing an operating system may be utilized. Of course, computers more advanced than Pentium class can be utilized as well. Each PC 10 can include a display monitor, a processor, memory such as ROM and RAM, a file storage device, a keyboard, a pointing device, a communication interface, and a graphic user interface GUI operating system having "drag & drop" functionality. Preferably, the operating system is Microsoft Windows NT, Windows 95, Windows 98, or Windows 3.1x, all available from Microsoft Corp. However, the operating system may be any other graphically oriented operating system such as Mac OS available from Apple Computer, Inc., Solaris, Xwindows, etc.

Each PC 10 runs a computer program incorporating functional modules, such as those illustrated in FIGS. 2-9 and 11-13, and has a GUI consisting of windows, such as those illustrated in FIGS. 15 through 24 described below. The file transfer system shown in FIG. 1, including the PCs 10 running the computer program and graphical user interface, enables direct transfer of electronic files between such interconnected PCs 10 without requiring login to each other PC 10, and without intermediate storage of files on an intervening computer. A credit request processor 16 and independent certification processor 18 may also be provided and are discussed in detail below.

The GUI is generated by a computer program designed for a windowed operating environment such as Microsoft Windows. The GUI consists of modules for controlling system communications and functions accessed from the GUI, and graphics modules that call or create display windows. Exemplary display windows include a transmit window for indicating candidate files that can be transmitted, a destination window displaying candidate PC destinations to which files can be transmitted, and an event log window that displays transmitted files that have been sent or received. Furthermore, the GUI provides user controls for initializing and invoking system operating criteria via dialog windows.

In greater detail, the following describes the operating functions of a preferred embodiment of the computer program and graphical user interface of the present invention from the perspective of both the sending PC and the receiving PC. Although the description is in terms of software, the present invention can also be implemented with firmware, a combination of hardware and software, or with only hardware such as a with a fixed function machine or application specific integrated circuits, etc. In order to effect a file transfer, the computer program of a preferred embodiment of the present invention must be operating on both the sending PC and the receiving PC during the time communication is attempted. Other required operating conditions include active connection to the Internet, intranet or extranet, or a modem connection to the PSTN; "power-on" or standby state at both the sending and the receiving PC; and a windowed operating system such as Microsoft Windows NT, Windows 95 or Windows 3.1 installed and operating on both the sending PC and the receiving PC.

In a preferred embodiment, control modules govern and supervise the transmission and receipt of files across the connected communications pathway. Moreover, a transmit window displays a list of files stored on the file storage device. When files displayed in the transmit window are selected then dragged & dropped on to a graphical object, the drag & drop function of the windowed operating system internally creates a list of files with an associated file structure. The internal list is then linked by the operating system to the destination object represented by the graphical object.

In a preferred embodiment, each candidate PC destination is displayed as a user created "nick name" in a destination window. Still further, each nick name may be a graphical object, invoked by the user, generated by a computer program module and linked to a destination address (either IP address or PSTN number), and a computer program subroutine. When files are dragged and dropped onto the destination object in the destination window, a file list with associated file structure is created by the windowed operating system and a control module displays a dialog box prompting the user for confirmation that the selected files contained in the file list are to be transmitted to the destination selected.

In a preferred embodiment, after the user confirms the files to be transmitted, a compression control module calls a compression subroutine that copies and compresses the files contained in the file list, and stores the compressed file packet on the PC's file storage device. In the context of this specification, a "file packet" is preferably a grouped and compressed assembly of files, rather than a multiplexing or frame-transmission "packet". Then, the control module sends a packet file name and the address linked to the selected destination object to a pending event log file.

Later, at a predetermined time, a control module initiates a connection with the destination PC via an appropriate communications pathway, identifies the sending PC by its name and destination address, then transmits the packet containing the compressed files to the linked destination address across the connected communications pathway. The control module then indicates in an event log window by date, time, and content (which may include file names and associated file structure), when the transmission of the packet is complete.

The predetermined time is selected by the user. Thus, after selecting a file to send, the user may schedule the transfer to occur immediately, or at a later time and/or date. If the file transfer is scheduled for later, the packet file name and destination address remain in a pending event log file until the designated date and time.

In preferred embodiments, a control module responds to inbound file transmissions, captures, decompresses, and writes transmitted files to the computer file storage device using the associated file structure, and creates a received file list that is linked to the stored files and displayed in the event log window showing date, time and content. Still further, the control module initiates a continuous sequence for visibly indicating when a packet has been received by a destination PC. Preferably, user selection of the received file listed in the event log window launches any application that has been associated with the file type received.

Figure 2:
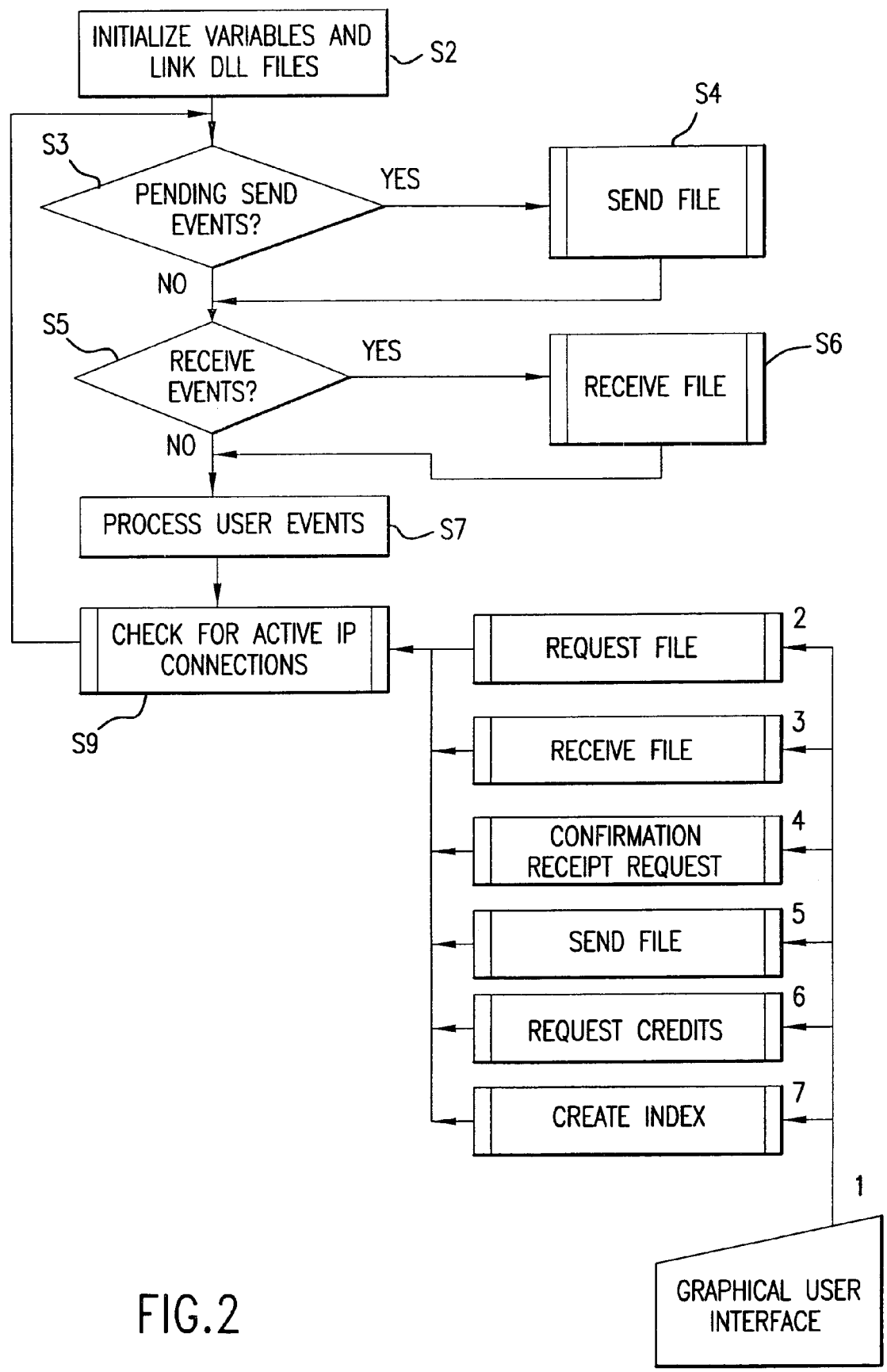
FIG. 2 is a flow diagram of exemplary logic of a main control module which controls automated functions and user invoked functions accessed through a graphical user interface, according to an aspect of the present invention.

System Control: FIG. 2 & FIG. 15

According to a preferred embodiment of the present invention, the computer program and graphical user interface operating on each interconnected PC 10 provides for system control and user interaction. A main control module, illustrated in FIG. 2, is provided for controlling automated system functions as well as functions accessed through the graphical user interface 1. When the user activates the computer program through the graphical user interface 1, the main control module initializes system variables and links DLL files required for system operation at step S2.

A DLL is a dynamic link library and is a standard Microsoft Windows convention for storing functions called by application programs. DLLs can be part of the Windows operating system, application program interfaces (APIs) from software vendors, or functions written for a specific application. Table 1 illustrates exemplary DLLs for the present invention and their purpose.

TABLE 1

| Type: | Purpose: |
|---|---|
| Windows standard dlls | |
| user | GUI interface |
| shell | Drag and drop support |
| kernel | File and memory functions |
| Toolbox functions | |
| tb50dos.dll | File and directory support |
| tb50win.dll | High level GUI support |
| tb50dlg.dll | Common dialog functions |
| Third Party APIs | |
| saxcom 10.dll | Modem file transfer functions |
| compress.dll | Compression functions |
| Custom DLLs | |
| adis.dll | Destination book functions |
|  | Indexing functions |
| hyper.dll | Log functions |
| ftpip.dll | Internet file transfer functions |

Saxcom 10.dll is available from Sax Software Corporation of Eugene, Ore. and implements several file transfer protocols for use with analog telephones, including Zmodem.

Operation of the main control module in each PC 10 is centered on a pending events file. The pending events file contains a list of events initiated by user interactions or communication requests from other interconnected PCs 10. At step S3 the main control module monitors the contents of the pending events file to determine if any pending send events exist. If pending send events are detected, at step S4 the main control module calls a send file module, described below with reference to FIG. 3. After the send file module executes at step S4, or if no pending send events are detected at step S3, the pending event file is again monitored to determine if any pending receive events are present at step S5. If pending receive events are detected at step S5, the main control module calls a receive file module at step S6, described below with reference to FIG. 4. Otherwise, or after the receive file module executes, at step S7 user events are processed.

User events originate in response to user interaction with control windows provided by the graphical user interface 1, and resulting computer program functions initiated by such user interactions. An exemplary user event is scheduling a file transfer of a user selected file. Exemplary events are shown to originate from modules 2-7 shown in FIG. 2. Each module 2-7 is invoked from the graphical user interface 1. Processing the user events involves executing module specific logic and is described below.

At step S9, internet protocol (IP) connections are checked by a function described below with reference to FIG. 17. Subsequently, the logic returns to step S3 and repeats as described above.

Referring to the display screen shown in FIG. 15, both completed and pending events 24 can be viewed in an event log window, such as that shown in FIG. 15. Furthermore, file transfers are logged recording the date, time, and content of the transfer at both the sending and receiving PCs. Clicking on each tab 20 at the top of the event log window displays all events having the selected property indicated on the selected tab (e.g., failed, pending, etc.). The Decrypt button 21 launches a function (described below) which decrypts received files that were encrypted by the sender. Decryption can also be implemented without manual intervention depending on the functionality of encryption/decryption programs integrated into the file transfer system. The Close Log button 22 closes the event log window. Preferably, the contents of the event log window includes for each event: the sender and receiver of the file, the time and date the file transfer occurred, whether the event was a send event or a receive event, and the status of the file transfer. Exemplary file transfer statuses are: completed transfer, pending transfer and failed transfer. An additional symbol e.g., R or U, may be displayed to indicate whether a file has been read. When employing the additional symbols R signifies the file has been read, and U signifies that the file has not been read.

File Transfer System: See FIG. 3 and FIG. 4

An aspect of the present invention is the file transfer system. There are several parts to such a system. The first is the Windows Sockets system. In the present invention, to send a file from one interconnected PC to another, each PC must be able to detect communication requests for other PCs. A preferred system for detecting communication requests requires each PC to create at least one data structure, called a socket, that listens for communication requests at a specific port on each PC. In a preferred embodiment, one listening port is created at port 789. However, any port or ports can be utilized, as long as all versions of the computer program on each interconnected PC recognize and connect to the ports used to initiate a transfer. As a result of the established socket, each PC listens continuously for a communication request from another PC.

In a preferred embodiment, a PC connection to the Internet or private intranets and extranets using TCP/IP is established by invoking subroutines which create data structures called sockets that enable communication using TCP/IP standards. A listening socket is established that permits the PC to monitor the Internet, intranet or extranet for inbound communication requests initiated by other PCs. When an inbound communication request is detected, a control module in the receiving PC evaluates the request within the context of selective acceptance criteria prior to accepting receipt of the communication request. In other words, the receiving PC automatically decides whether it will accept communication from the sending PC based on criteria such as authenticated identity. The receiving PC terminates transmissions from unauthorized PC destinations.

The selective acceptance criteria is established during system initialization. The receiving PC evaluates whether it will accept a request according to various user defined criteria. For example, the receiving PC may examine the addresses in the destination file and accept communication only from addresses listed in the destination file. Alternatively, the receiving PC may only allow receipt of communications from PCs using software having selected serial numbers. For example, license codes initialized during setup at each system PC can be utilized automatically in conjunction with the destination addresses to further authenticate the source identity for inbound communication requests. Alternatively, encrypted authentication codes initialized during setup at each system PC can be utilized in conjunction with the destination addresses and/or license codes to further authenticate the source identity for inbound communication requests. The user may configure the acceptance criteria at installation and may change the acceptance criteria at any time thereafter.

In preferred embodiments, if a control module at the receiving PC accepts the communication request from a sending PC, a separate socket is established by control modules at both the sending and receiving PCs. The file transfer is via the separate sockets. Meanwhile, the listening sockets at both the sending PC and the receiving PC are maintained. As communication requests from sending PCs are detected and accepted by PCs engaged in sending or receiving one or more concurrent and ongoing transmissions, multiple sockets enabling simultaneous file transfers are created by a control module at each PC receiving such communication requests. In preferred embodiments, a control module in a sending or receiving PC creates and places in a linked list one file transfer socket for each additional, concurrent inbound or outbound communication. This list facilitates managing the flow of file transfers. Thus, multiple discrete connections can be established with multiple remote computers across the various communications pathways to which the local computer is connected.

Figure 3A:
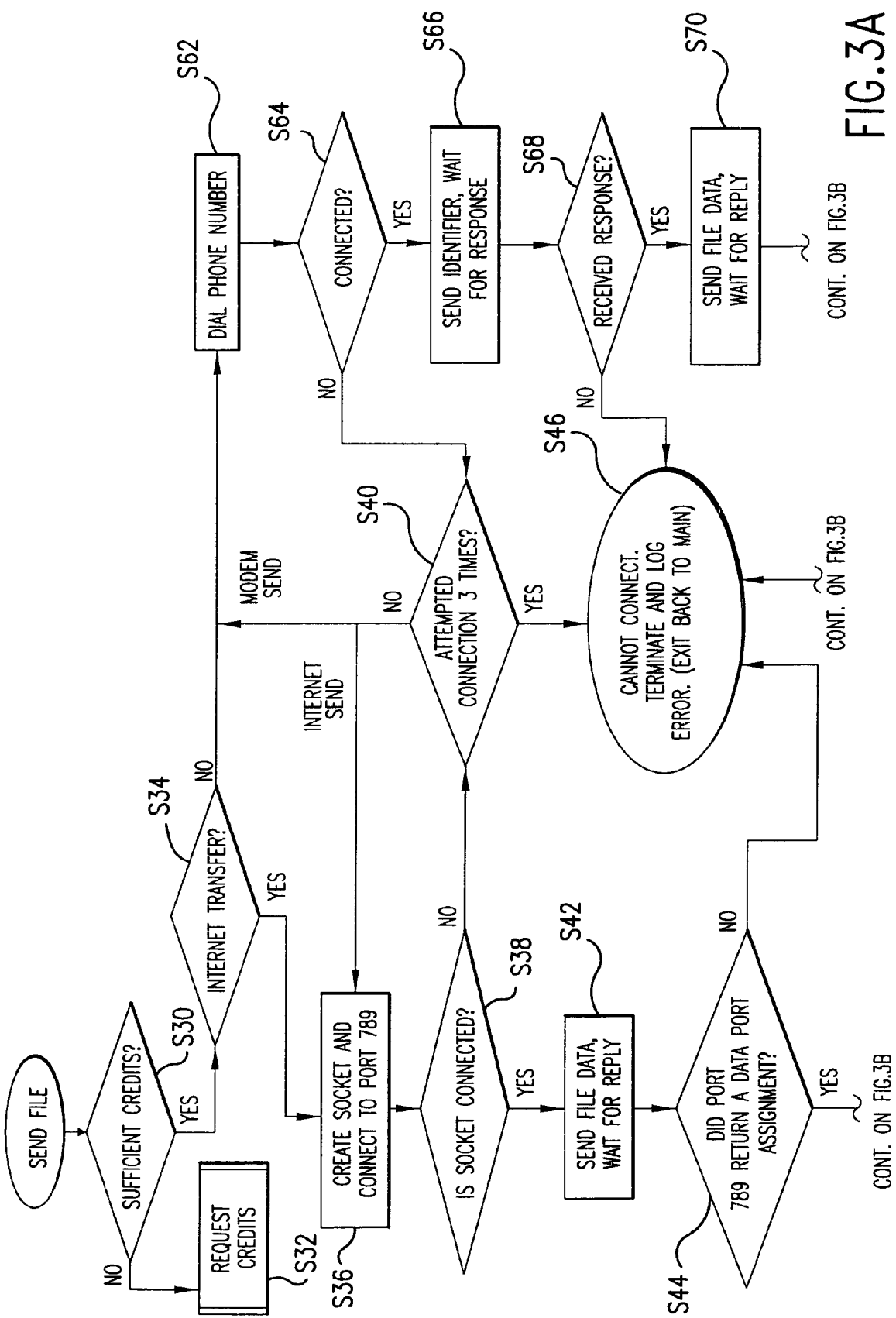
FIGS. 3A and 3B are flow diagrams of exemplary logic of a send file module which controls the file transmit functions, according to an aspect of the present invention.
Figure 3B:
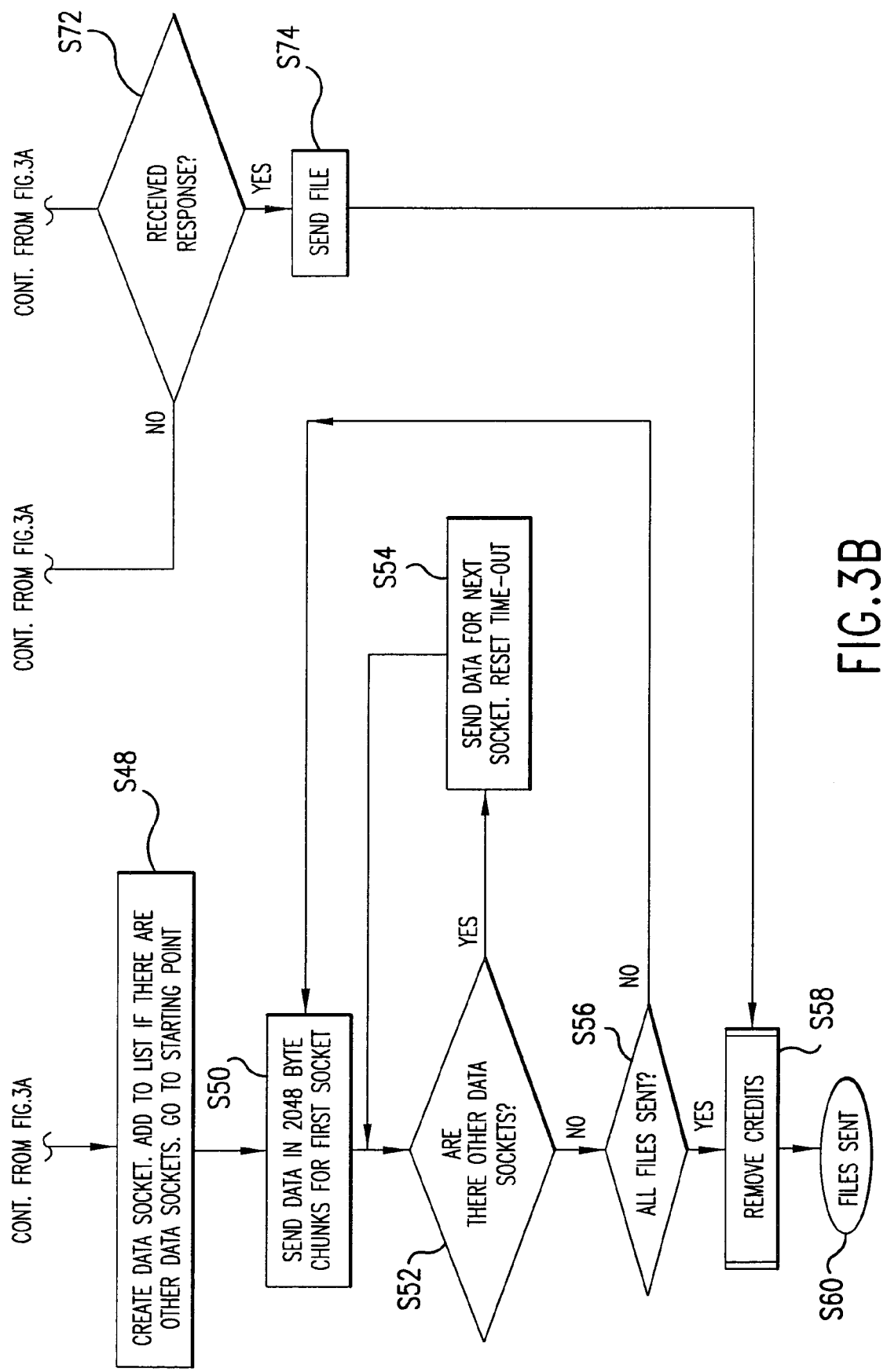

The process of sending a file is now described with reference to FIG. 3. Initially at step S30, it is determined whether sufficient credits exist for transferring the file. The credit sufficiency analysis is described below. If insufficient credits are found, at step S32 additional credits may be requested as described below. If sufficient credits are found, at step S34 it is determined whether the transfer is intended to be an Internet (or intranet/extranet) transfer.

If the transfer is an Internet transfer, at step S36 another socket is created. In addition, the sending PC connects to the listening socket on the remote PC at port 789. When another transmission is already executing, the newly created socket is added to the linked list of sockets in use. The program traverses the list, giving sockets time to perform their actions. Thus, multiple transactions can occur substantially simultaneously. In practical terms, the number of transactions that can be handled by the system depends on factors such as communications speed and processor time and speed.

At step S38 it is determined whether the connection to the remote PC is successful. If the connection has not been established, at step S40 it is determined whether the sending PC previously attempted to connect to the remote PC. If a previous attempt occurred, it is determined whether a maximum number of attempts have occurred; in a preferred embodiment three attempts. Thus, if three unsuccessful attempts occurred (any number can be specified), at step S46 the logic terminates execution and an error is logged indicating that a connection cannot be established with the remote PC. Alternatively, the local computer may be setup to delay the file transfer until the remote destination computer has an active connection to the communications pathway at a known address. If the number of attempts is less than the maximum number of attempts allowed, the sending PC again attempts to connect to the remote PC at step S36.

If the connection is successfully established, at step S42 the sending PC sends information about the file to be sent and about the sending PC, thus informing the remote PC of where the transmission is originating. The sending PC then waits for the remote PC to send an address to which the file can be sent. If the data received from the remote PC corresponds to a valid data port assignment, the logic proceeds to step S48. Otherwise the logic proceeds to step S46 where the logic terminates execution and an error is logged indicating that an invalid reply was received.

At step S48 upon receiving a valid data port assignment, a new data socket is created and a connection is established between the new data socket and a data port corresponding to the data port assignment received from the remote PC. In addition, a time-out timer commences and the starting point of the file is determined. When another transmission is already executing, the newly created data socket is added to a linked list of data sockets.

At step S50 data is sent to the remote PC. In a preferred embodiment, the file being transferred is transmitted 2048 bytes at a time. Thus, the first 2048 bytes are transmitted at step S50. Each time data is sent at step S50, the time-out is reset to zero. If the time-out reaches a maximum time, the connection is terminated and the data socket is destroyed.

At step S52 it is preferably determined whether other data sockets exist in the data socket linked list. If other data sockets exist, at step S54 data associated with the next data socket is sent, and the logic repeats from step S52 until no other data sockets are found.

At step S56 it is determined whether the end of the file has been reached. If the end of the file has not been reached, the logic returns to step S50 and repeats. If the end of the file has been reached, at step S58 the connection is terminated, the data socket is destroyed, and the remove credits module is called. Finally, at step S60 the event is recorded in the log file.

A preferred embodiment of the present invention utilizes a single designated User Datagram Protocol (UDP) command port to exchange file characteristic information, user authentication information, and to initiate a transfer. Subsequently, a TCP data port is opened to exchange the file content. The UDP command port allows faster connections and quicker data transfer than a TCP port. However, a TCP port is more reliable for data exchange. Consequently, a preferred process for sending a file is as follows:

1) A sender initiates a transfer by sending file characteristic information and sender identification/authentication information to a specified UDP command port on a destination computer at a specific IP address. If the transfer is accepted, a data port is created randomly within a range of possible specified ports and its number is returned on the UDP connection. Otherwise, a notification that the transfer is rejected is sent, and the UDP connection is closed. Finally, the UDP command port waits for new transfers to be initiated.

2) If the transfer is accepted by the recipient, the sender connects to the TCP data port returned by the recipient over the UDP connection and starts sending the file. Both the recipient and sender resume "listening" on the UDP port for transfers initiated by other computers. This is accomplished while the file transfer over the TCP port is in progress. The process is repeated and managed for any number of subsequently initiated file transfers. Thus, multiple, simultaneous file transfers can be accomplished with any number of other computers, with only one instance of the computer program open and running. Advantages of the present invention include a simple user interface and operating approach, great efficiency in system resource utilization, and fast file transfer speed.

3) The receiver closes the connection when the file size information (characteristic) sent over the UDP connection that initiated the transfer matches the size of the file received or the sender closes its connection due to an error.

In other preferred embodiments of the invention, more than one UDP command port listens for or initiate file exchanges. To initiate a transfer, a sender PC randomly and automatically selects the UDP port from a set of specified ports. For example, one, two, or more UDP ports at predetermined port numbers could be designated as listening ports. A sender PC initiates a file exchange on a UDP port randomly selected from the set of specific listening ports. The recipient monitors the set of specified ports for initiated file transfers and responds on the UDP port utilized by a prospective sender to acknowledge the connection and return a designated data port. This configuration also lowers the probability of a "collision" in the event that two or more computers attempt to communicate with the same PC at exactly the same time. Alternatively, if such collisions did occur, the attempted communication can be automatically retried at a random interval later in time.

If the file transfer is determined to be a PSTN transfer at step S34, at step S62 the sending PC dials the telephone number associated with the remote PC. At step S64 it is determined whether a connection has been successfully established. If no connection was established, the logic proceeds to step S40 where it is determined whether a connection attempt occurred previously. If a previous attempt occurred, it is determined whether a maximum number of attempts have occurred; in a preferred embodiment three attempts. Thus, if three unsuccessful attempts occurred, at step S46 the logic terminates execution and an error is logged indicating that a connection cannot be established with the remote PC. However, if the number of attempts is less than the maximum number of attempts allowed, the sending PC again attempts to connect to the remote PC at step S62.

After the connection is established handshaking occurs, and at step S66 the sending PC sends an identifier and waits for a response from the remote PC. At step S68 if a response is not received, at step S46 the logic terminates execution and an error is logged. If a response is received, at step S70 the sending PC sends file and station information to the remote machine. Then, the sending PC waits for a reply from the remote PC. If no reply is received, at step S46 the logic terminates execution and an error is logged. Once the reply is received, at step S74 the file is sent to the remote PC utilizing a file transfer protocol. In a preferred embodiment, Zmodem is the file transfer protocol. Upon completing the file transfer, the connection is terminated. Subsequently, the transfer status of the sent file is logged, and the logic proceeds to step S58 to continue as previously described.

Figure 4A:
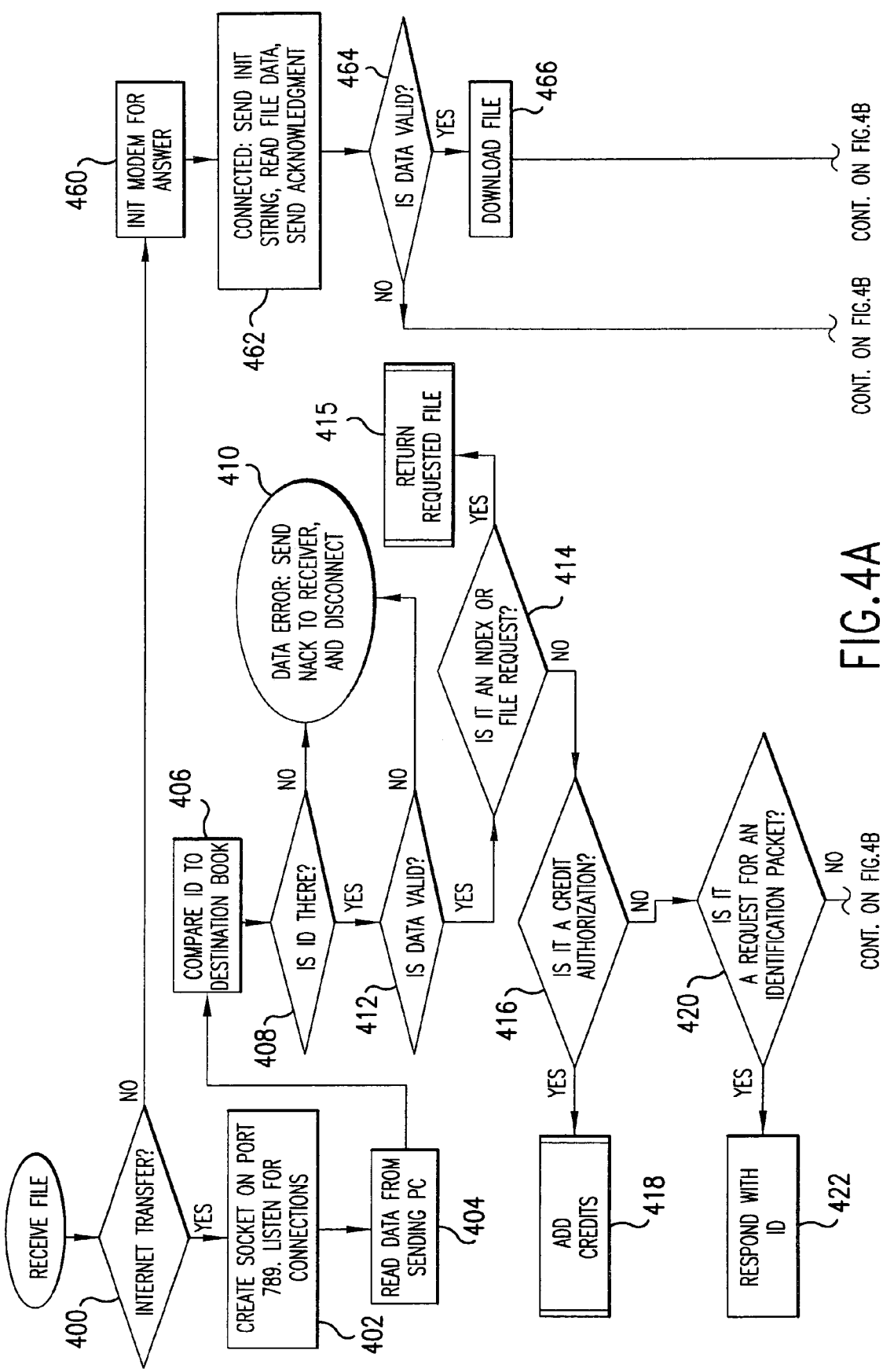
FIGS. 4A, 4B and 4C are flow diagrams of exemplary logic of a receive file module which controls the receive file functions, according to an aspect of the present invention.
Figure 4B:
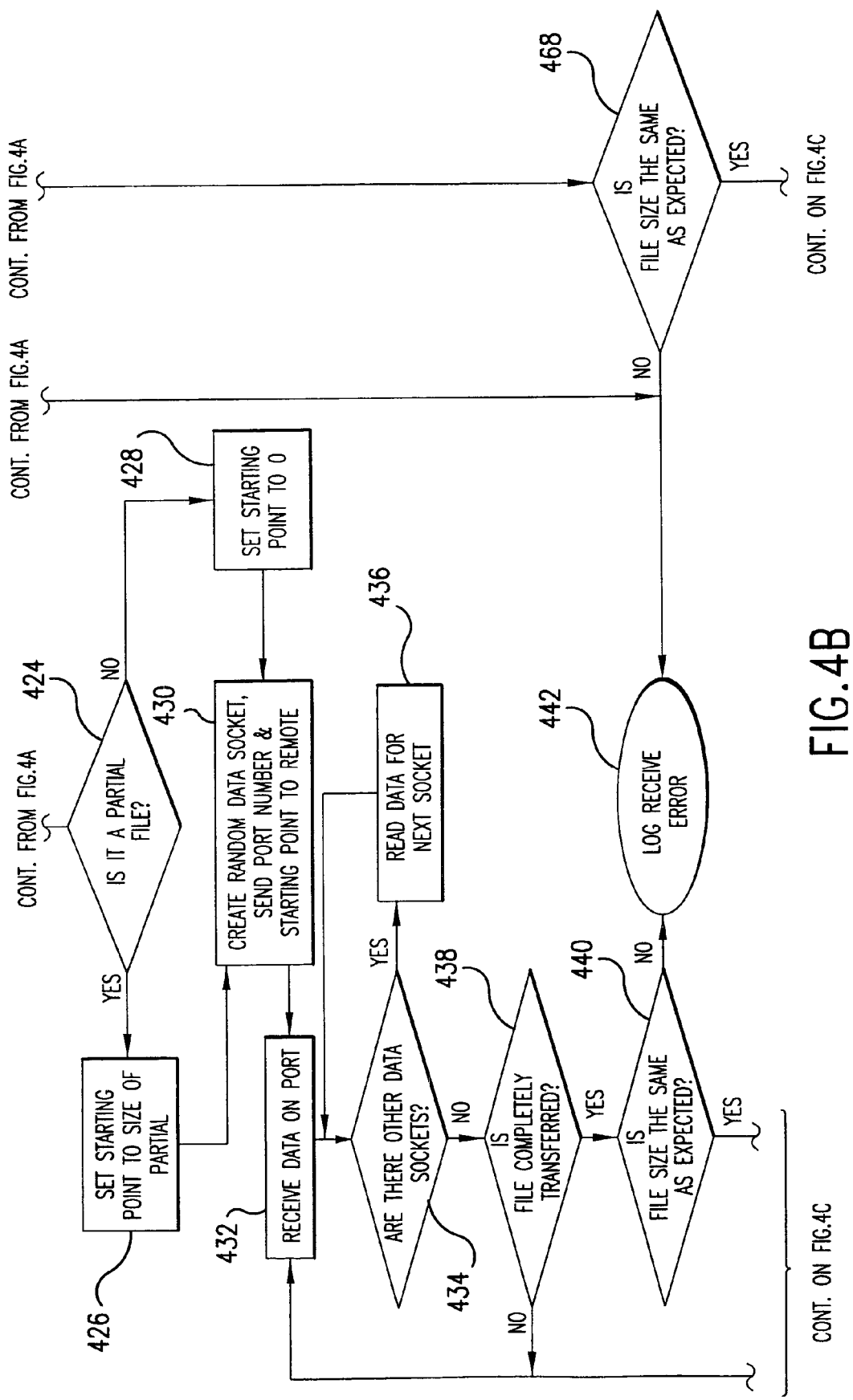
Figure 4C:
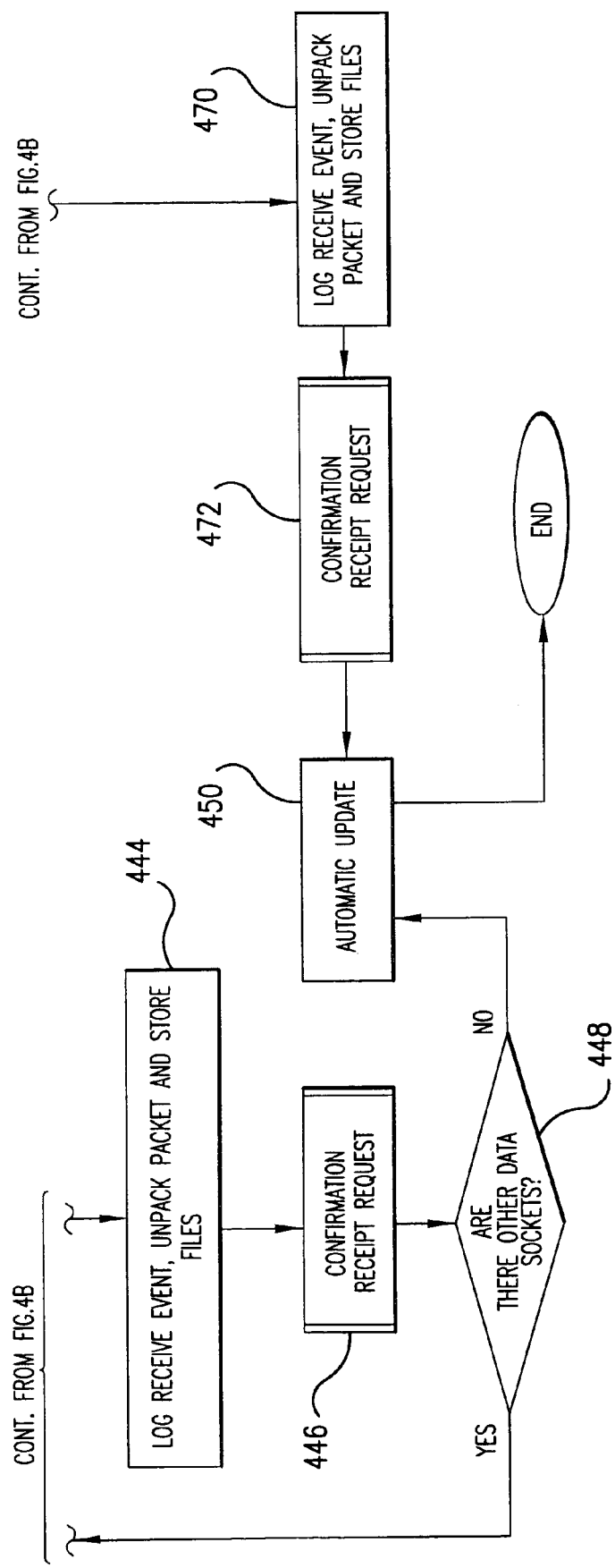

The logic which executes at the remote/receiving computer is now described with reference to FIG. 4. Initially at step 400 it is determined whether the transfer will be an Internet (or intranet/extranet) transfer. If the transfer is expected to be an Internet transfer, at step 402 a socket is created on port 789 and the receiving PC waits for a connection. When someone connects, at step 404 all sent data is read. Then, at step 406 the received data (i.e., ID) is compared to IDs within a destination book of IDs from which transfers will be accepted. If the received ID is not found in the destination book, at step 410 an error occurs and the connection is terminated. If the ID is found at step 408, at step 412 it is determined whether the received data is valid. If the data is not valid, at step 410 a negative acknowledgment is sent to the sending PC and the connection is terminated.

If the data is valid, at step 414 it is determined if the received data indicates an index or file request. If the received data indicates an index or file request, at step 415 the request is processed. Otherwise, at step 416 it is determined whether the received data indicates a credit authorization. If the data indicates a credit authorization, at step 418 transmission credits are added, described in greater detail with reference to FIG. 11. Otherwise, at step 420 it is determined whether the received data indicates a request for identification. If the received data indicates a request for identification, at step 422 a response is sent to the requesting PC with the ID of the receiving PC. Otherwise it is determined whether the received data is a partial file at step 424.

The partial file determination occurs to decide whether an interrupted transfer is being resumed, or whether a new transfer is beginning. Thus, if the received data is a partial file, at step 426 a starting point is set to the size of the partial file because part of the file must be resent. In other words, the receiving machine informs the sending machine of where to resume the transmission depending on what portion of the file was previously received. Subsequently, at step 430 a socket is created on a random port, the random port address is sent to the sending PC, and a time-out timer is set. If the received data is not a partial file, i.e., a new transfer is beginning, at step 428 the starting point is set to zero. Subsequently, the logic proceeds to step 430.

From step 430, the logic proceeds to step 432 where the receiving PC waits for data on the port. When data is received, the time-out counter is again reset. Preferably, there is an automatic visible indication of receipt of files at the receiving PC. At step 434 it is determined whether other sockets exist. If other sockets do exist, at step 436 data is received for the next socket. Subsequently, the logic returns to step 434 and repeats until no other sockets are found. Similar to the sending PC, the data sockets may be stored on the receiving PC in a linked list.

At step 438 it is determined whether a file transfer is complete or if data times out. If the data times out, the connection is terminated and the socket is destroyed. Also, if the connection terminated on its own, the socket is destroyed. If no transfer is found to have completed, the logic returns to step 432 and repeats. When a file transfer is complete, at step 440 it is determined whether the received file is the same size as expected. In other words, the file size is compared to the size indicated in the file data sent at step S42. If the sizes do not coincide, at step 442 a receive error is logged. Otherwise, if the file sizes are the same, transmission is deemed successful and the logic proceeds to step 444.

At step 444 the event received is logged, the packet is unpacked, and the received files are stored on the receiving PC's storage device. Although in the previous description the sending PC is identified, by name and IP address, to the receiving PC upon initial connection, the identification can come at a later time. However, preferably the sending PC is identified to the receiving PC before the receiving PC opens the received files. Next, at step 446 logic described with reference to FIG. 5 executes to process confirmation receipt requests. Subsequently, the logic proceeds to step 448.

At step 448 it is determined if any other data sockets exist. If additional data sockets are found, the logic returns to step 432 and the processing repeats. If no other data sockets are found, the logic flows to step 450 where an automatic update process executes.

Verifying the data is handled by the TCP/IP protocol that underlies the Windows Socket specification. Because the TCP/IP protocol handles sending and receiving data, file verification is automatic. That is, TCP/IP is an error responsive protocol that checks each TCP packet using cyclic redundancy checking (CRC) and retransmits bad packets. Accordingly, if a file is assembled from successfully received TCP packets, the probability that the received file is error-free is very high. Thus, it is only necessary to verify whether the entire file was received. This is accomplished by verifying that the size of the data transmitted matches the specified size of the file that is received. The file size specification is sent with the file being transmitted and arrives at the receiving PC at the beginning of the transmission.

For modem transfers, the process is different. Thus, if the transfer is determined not to be an internet transfer at step 400, at step 460 the modem is set to auto answer mode, so that it will answer if called. Preferably the modem is set to auto answer mode during initialization at step S2 on each PC.

After the modem is initialized, at step 462 the receiving PC waits for a telephone call. Upon receiving a call, the receiving PC answers and reads a data stream from the modem to determine the sending PC identifier. If no data is received before a time out occurs, the connection is terminated. If data is received, the receiving PC sends a response to the sending PC, which includes an identifier of the receiving PC.

At step 464 file data validity is checked. If the data is invalid, a receive error is logged at step 442. Otherwise if the data is valid, at step 466 the download commences with an agreed upon model protocol, preferably, Zmodem that checks each packet using CRC and retransmits bad packets. Subsequently, the logic proceeds to step 468 to determine whether the received file is the same size as expected, indicating a successful transfer. If the file is not the expected size, at step 442 a receive error is logged. If the received file is the expected size, at step 470 a receive event is logged, and the received packet is unpacked and stored on a storage device. Next, at step 472 logic described with reference to FIG. 5 executes to process confirmation receipt requests. Subsequently, the logic proceeds to step 450 and executes as previously described.

By using the Zmodem protocol, error checking is automatic. However, once again the file size is checked to ensure that the received file is the size it is supposed to be.

Confirmation Receipt Request and Third Party Authentication: See FIG. 5 & FIG. 14

According to another preferred embodiment, the present invention enables a sending PC to request from a recipient PC, confirmation of the attributes of a transferred file packet. The confirmation is a returned file containing a received file list, along with the identity of both recipient and sender, as well as various other attributes. The receipt file is returned from the recipient to the sender directly or through a third party authenticator 18 (FIG. 1) without requiring any action by the recipient computer's user. The sender may designate whether confirmation is by direct return or through a third party authenticator 18 common to all users. The destination address of the third party authenticator 18 is either incorporated into the computer program prior to distribution to users or entered by a user prior to initiating the confirmation requests as part of setup of the computer program on the sending PC.

A control module on the recipient PC, upon receipt of a request for a confirmation of the attributes of a transferred file packet, records the content of the received packet. This may be set up to occur before or after it is decrypted and decompressed. By creating a file list, the content files are written into the file structure of the recipient computer's storage device. Still further, the control module on the recipient PC combines into a confirmation receipt file attributes of the transferred file packet. The attributes may include (1) a file list that delineates the names of files actually found to be present in a received packet, whether containing encrypted or unencrypted files, (2) the size of the files received, (3) the identity of the sending PC (point of origin) as received with the file packet, (4) the identity of the recipient PC, (5) the date of packet receipt, (6) the time of packet receipt, and (7) the electronic fingerprint (hash) of the transmitted files. Alternatively, the confirmation receipt may be setup to provide only verification of a file transfer action accomplished at a specific date, time, and destination.

Still further, if direct return has been requested by the sending PC, the control module on the recipient PC creates a pending event for immediate return of the confirmation receipt file to the sending PC, designating the corresponding destination address. Moreover, if the requested confirmation is designated by the sender to be returned through a third party authenticator, the control module on the recipient PC creates a pending event for return of the confirmation receipt file to the sending PC through the third party authenticator, designating the corresponding destination address. The confirmation receipt file is transferred to the third party authenticator along with the destination address of the sending PC that requested the confirmation. Still further, the third party authenticator, upon receipt of the confirmation receipt file, processes the file stamping a unique digital characterization of the file using commercially available file authentication application programs. The file authentication application programs are designed to create files for which any tampering or modification can be readily detected. Finally, the authenticated confirmation receipt file is transferred, after processing by the third party authenticator, to the destination address of the sending PC that requested confirmation. A copy of the authenticated confirmation receipt may also be sent to the recipient of the associated file transfer.

Figure 5:
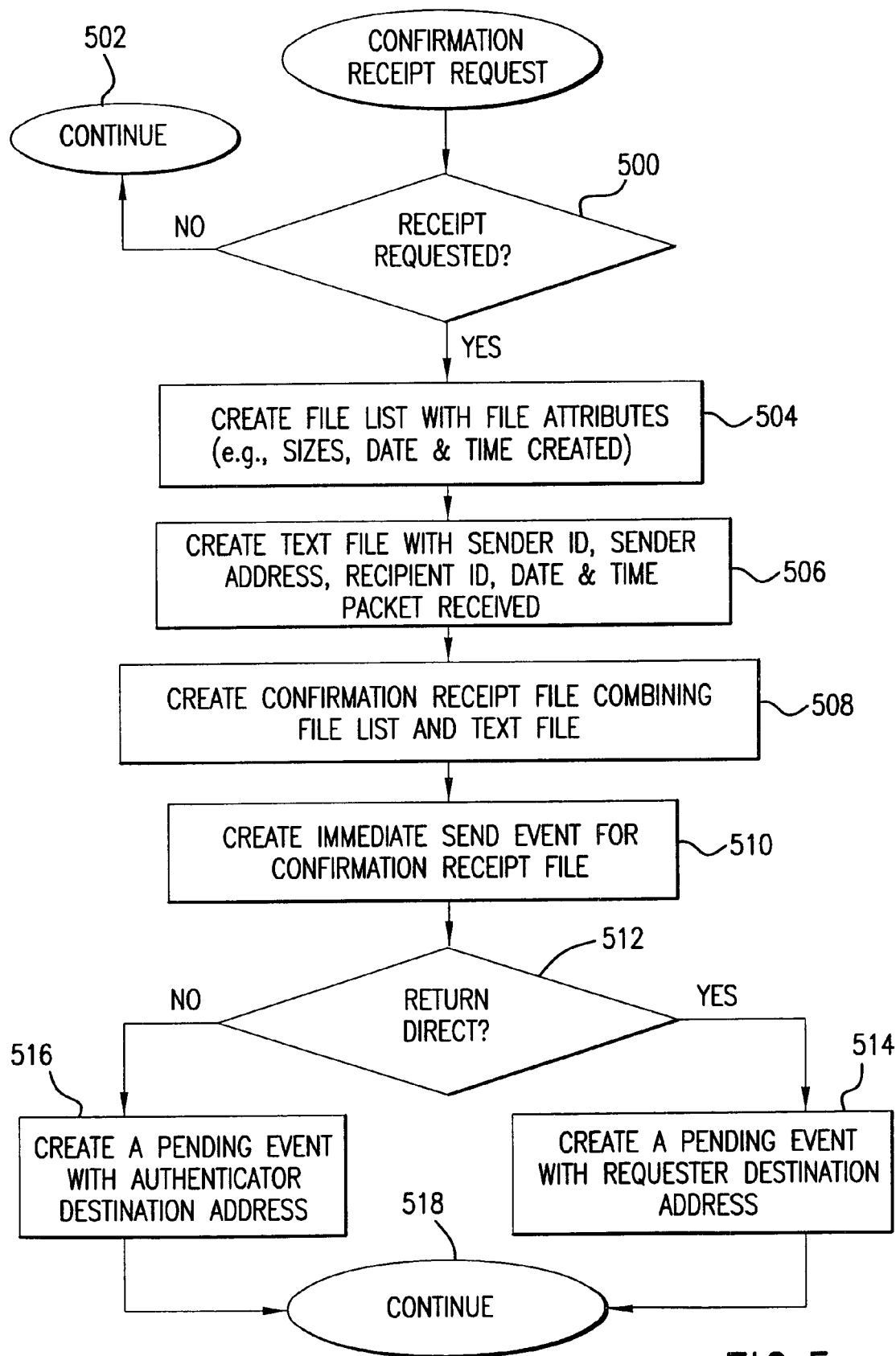
FIG. 5 is a flow diagram showing exemplary logic for confirmation receipt request processing, according to an aspect of the present invention.

The logic for processing confirmation receipt requests is now described with reference to FIG. 5. Initially, at step 500 it is determined whether a receipt has been requested. If no receipt has been requested, at step 502 the logic returns to FIG. 4. Otherwise, at step 504 a file list is created. Preferably, the file list includes file attributes of the transferred files such as the files sizes, and the dates and times the file were created. Next, at step 506 a text file is created. The text file preferably includes the sending PC's identification, the receiving PC's identification, and the date and time the file packet was received. Then, at step 508 a confirmation receipt file is created. The confirmation receipt file is a combination of the file list and the text file. Subsequently, at step 510 an immediate send event is created for the confirmation file.

At step 512 it is determined whether direct return has been requested. If direct return has been requested, at step 514 a pending event is created with the PC that requested the direct return as the destination address. If direct return has not been requested, third party authentication has been requested. Thus, at step 516 a pending event is created with an independent authenticator designated as the destination address. After completing either step 514 or step 516, the logic returns to FIG. 4 at step 518.

Figure 14:
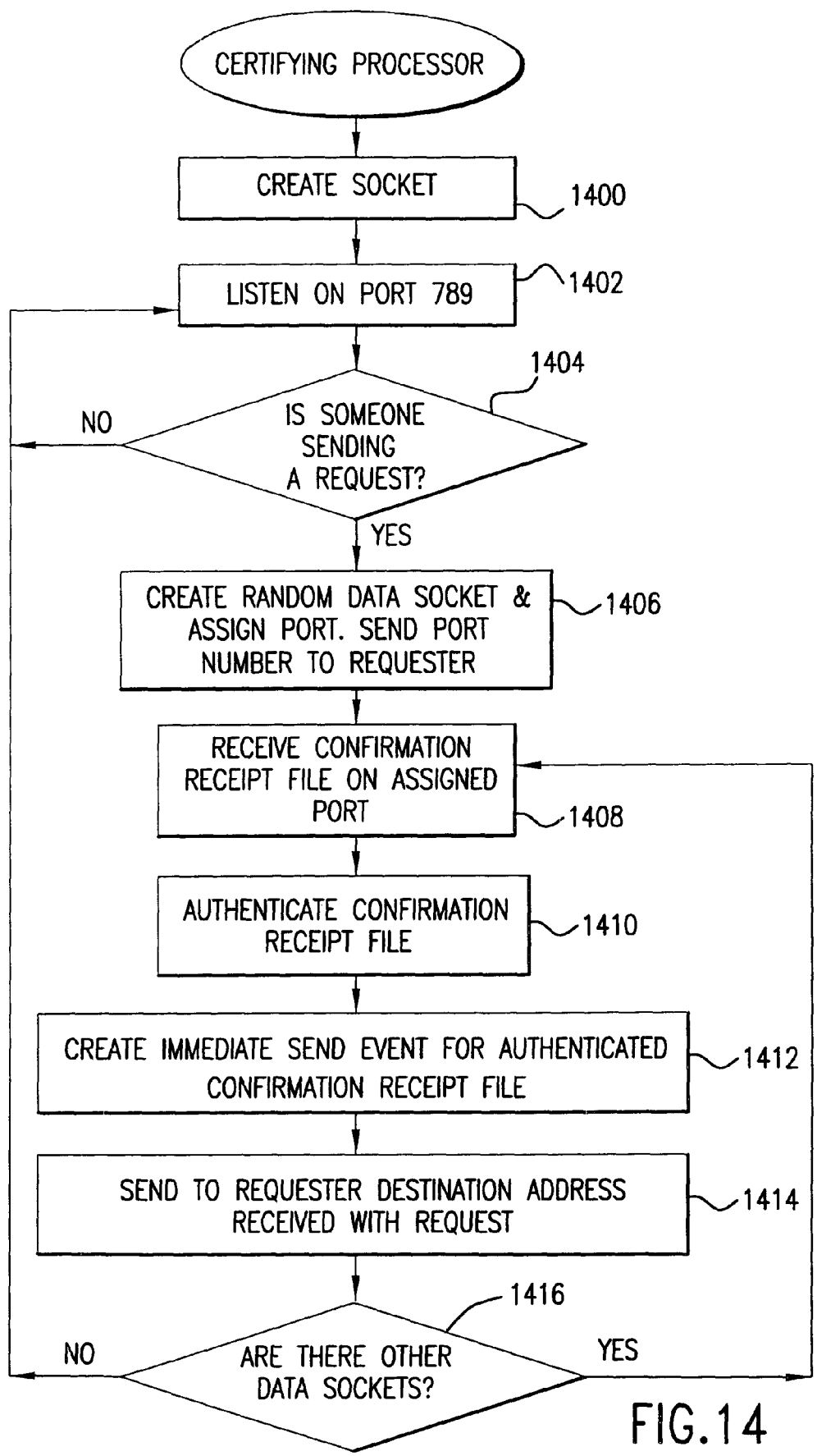
FIG. 14 is a flow diagram showing exemplary logic for a third party authenticator's processing of confirmation receipt requests, according to an aspect of the present invention.

Exemplary logic which executes at the third party authenticating machine is now described with reference to FIG. 14. Initially at step 1400 a socket is created for listening. In a preferred embodiment, the socket is at port 789. Then, at step 1402 the third party authenticator listens on the listening port. When data is received, at step 1404 it is determined whether a request is being sent. If a request is not being sent, the logic returns to step 1402 and repeats. If a request is being sent, at step 1406 a random data socket is created and assigned to a port, the number of which is sent to the requesting PC. Subsequently, at step 1408 the confirmation receipt file is received on the assigned port, and at step 1410, the file is authenticated. Next, at step 1412 an immediate send event for the authenticated confirmation receipt file is created, and at step 1414 the requestor is sent the destination address received with the request. Finally, at step 1416 it is determined whether other data sockets exist. If other data sockets do exist, the logic returns to step 1408 and repeats. If no other data sockets exist, the logic returns to step 1402 and repeats.

Event Log: See FIG. 15

All communication events are automatically logged by the computer program in an event log file, characterized by event properties such as date, time, file structure, and file name. The user can view and interact with logged events listed in the event log file by using a control window such as that shown in FIG. 15. Received files can be opened for viewing directly from the Event Log window, provided the file formats of the received files have been associated with an appropriate application program available on the receiving PC. Opening the files can be accomplished by selecting an event 24 listed in the Event Log window using the pointing device, then initiating control commands using the PC's pointing device or keyboard which opens a control window such as that shown in FIG. 16. The control window shown in FIG. 16 displays the properties of the logged event. Listed files can be opened by selecting the file 25, then initiating control commands using the PC's pointing device or keyboard which opens the file using an associated application program available on the PC. If no application program has been associated with the format of the listed file, a message informing the user or prompting user action is displayed. The Cancel button 26 closes the event properties window. The View Receipt button 27 displays any return receipt associated with a selected event.

Selecting and Sending Files/Packets: See FIG. 17, FIG. 19, FIG. 20, FIG. 21 & FIG. 25

The user at any interconnected PC of the present invention can initiate a send file event in a variety of ways. For example, by interacting with a control window such as the window shown in FIG. 17, the user can utilize the PC's pointing device to select files listed in a transmit window 28. Subsequently, by invoking the drag & drop function of the windows operating system, the user can drop files on destination objects 30 in the destination window. In response to dropping the file on the destination object 30, a file list created by the windows operating system is linked to the address of the destination object 30 and the file will be sent. Preferably, the file structure resident at the transmitting PC is replicated at the receiving PC for each sent file.

In a preferred embodiment, manual confirmation is required for each file selected to be sent to each PC destination. The manual confirmation requires user action in order to transfer each file. An automated screening of file transfer authorization may also be provided which only permits authorized transfers to occur. The automated screening may occur prior to transmission to each PC destination for each file to be transferred.

The buttons at the bottom of the destination window may also be employed in a preferred embodiment. Button 34 opens other destination windows. Button 36 minimizes the destination window. Button 32 opens the transmit window 28.

Figure 19:
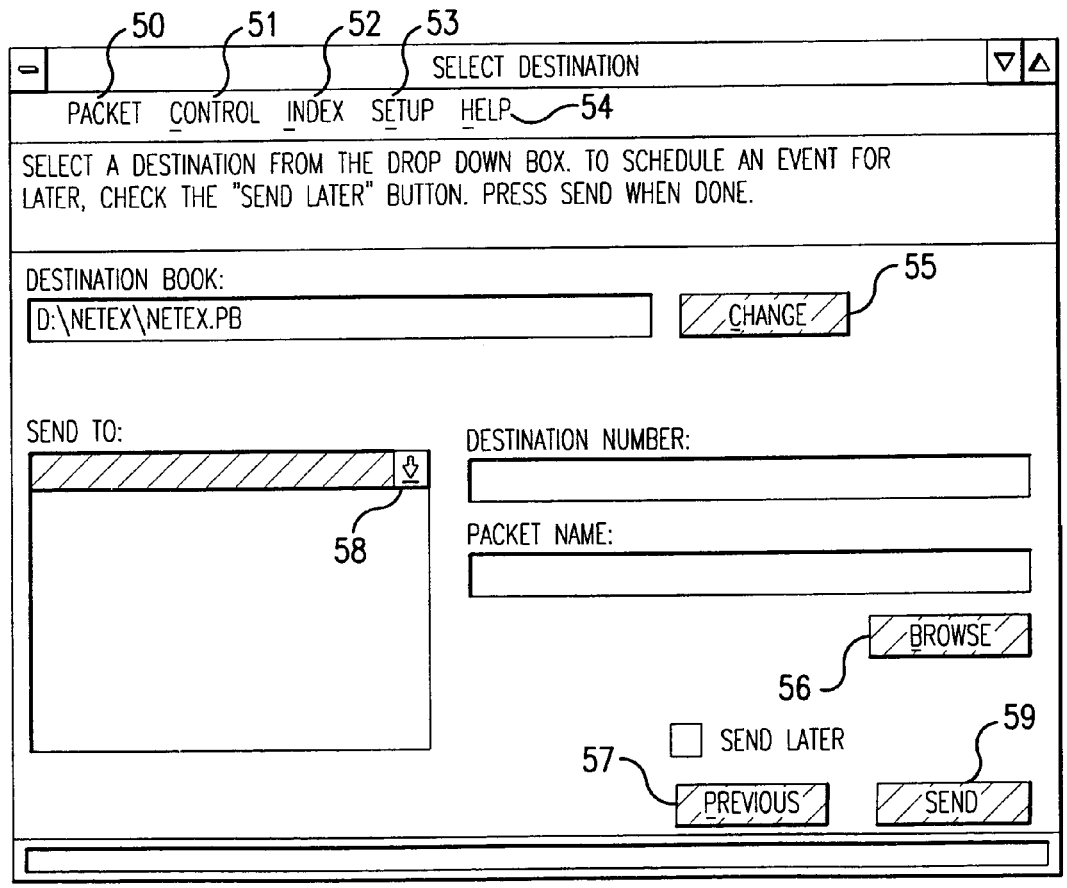
FIG. 19 shows an example of a select destination window for selecting the destination for the file transfer and initiating the file transfer, according to an aspect of the present invention.
Figure 20:
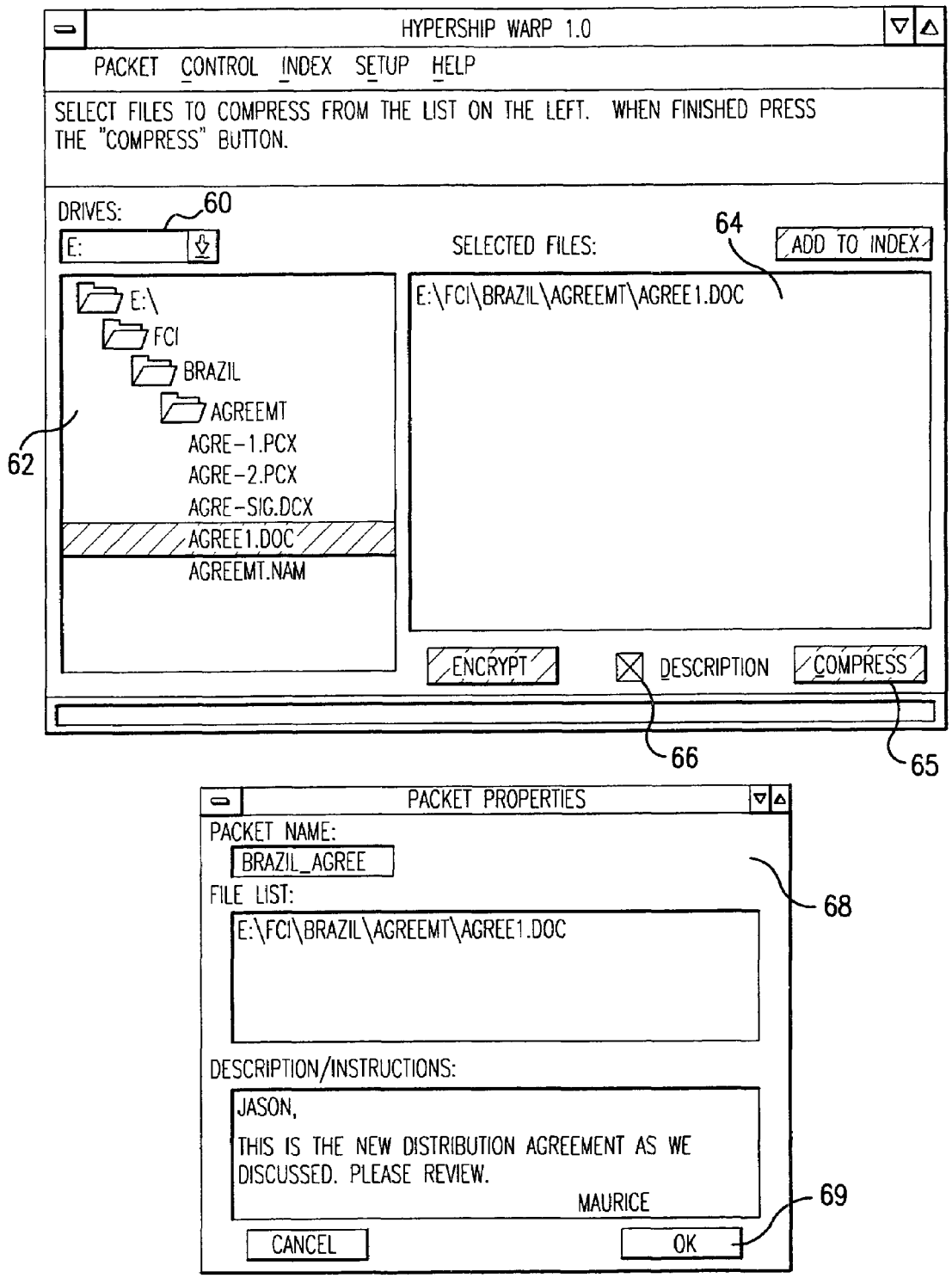
FIG. 20 shows alternative examples of a transmit window for selecting files to transfer, and the event properties window that shows the properties and listed files of events listed in the event log file, according to an aspect of the present invention.
Figure 21:
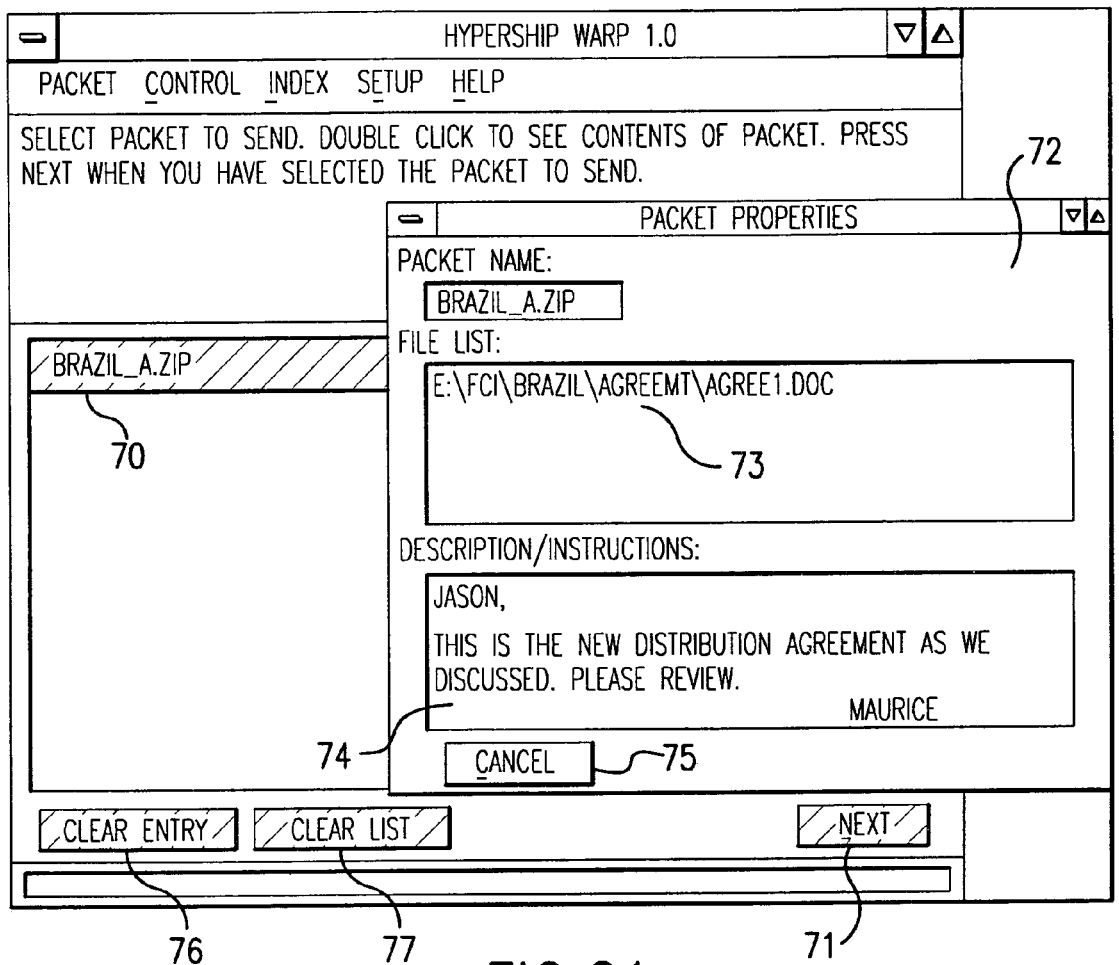
FIG. 21 shows alternative examples of a transmit window for selecting files to transfer, and the event properties window that shows the properties and listed files of events listed in the event log file, according to an aspect of the present invention.

Alternatively, a packet or file can be selected via the windows displayed in FIGS. 20 and 21, and the destination can be selected via the window shown in FIG. 19. According to the procedure employing the windows in FIGS. 19-21, the user selects a file or packet and creates a send event which can be scheduled either as an immediate transfer or a delayed transfer.

In FIG. 20, a Drives drop down list 60 enables selecting a disk drive that stores the files to be sent. When a drive is selected, the directory structure is displayed in a display field 62 showing directories, subdirectories, and files. After the user selects a file, the selected file is displayed in a display field 64, along with the corresponding file structure. Preferably, any selected files shown in the display field 64 will be compressed (all together if multiple files have been selected) into a file packet (also referred to simply as a packet) before being transmitted.

Clicking on a Description box 66 results in a user prompt 68 which permits the user to name the file packet and add a text message that will be sent along with the selected files. In a preferred embodiment, text identifying the user's name, organization, and address are automatically inserted. A text message may also be inserted into the dialog window by the user. Still further, the inserted text is then linked, by a control module, to the list of files to be compressed by the compression subroutine into a packet for transmission by a control module to a linked PC destination address. The text information about the sender and text messages contained in received packets are displayed in the event log window when associated received files are selected by the user.

In a preferred embodiment, one or more files may be selected from one or more directories in the file structure for compression, by a compression control module, into a packet for transmission to a destination PC address. The text message embedded with the files to be transmitted prior to compression at the sending computer is readily visible after decompression at the receiving computer. However, when encryption is enabled, text messages can be embedded with the files to be transmitted prior to encryption at the sending PC and made readily visible at the receiving PC after decryption. Alternatively, the text messages can be embedded with the files to be transmitted after file encryption at the sending PC. Consequently, the text messages are readily visible prior to file decryption at the receiving PC. The text messages are saved in a text file that the receiving computer recognizes and consequently displays upon receipt.

If the Description box 66 is not checked, no user prompt 68 is displayed, and the packet is created with a standard message and a random number as a name. The user prompt 68 may also be displayed when a Compress button 65 is selected. Clicking an OK button 69 initiates a compression function by calling the zip compression function in the compress.dll that creates the file packet. The user prompt 68 is then closed and the Compress button 65 is replaced by a Next button that enables the user to switch to the select destination window (FIG. 19).

If the user wishes to send a previously created file packet, a send existing packets window (FIG. 21) can be reached via the Packet menu 50 in FIG. 19, or in any other screen where the Packet menu appears. In FIG. 21, selecting a packet 70 then clicking on the Next button 71 switches the user to the select destination window (FIG. 19), where the destination for the selected packet can be designated. Double clicking on a packet 70 results in a display 72 showing the contents 73 of the packet and any associated message 74. Clicking the Cancel button 75 closes the display 72. The Clear Entry button 76 deletes any selected packet 70. The Clear List button 77 deletes all packets 70 in the list of displayed packets.

The select destination window for selecting a destination to send the file to is now described with reference to FIG. 19. The Packet menu 50 enables initiating a file transfer, index request, file request, or log display. A Control menu 51 offers options for establishing a link to an active Internet/intranet/extranet connection and/or initializing a modem. An Index menu 52 permits accessing the index build/edit function, and a volume manager. The volume manager enables naming and deleting volumes, which are logical divisions within an index. A Setup menu 53 enables modifying the computer program setup in terms of directories, modem parameters, user information, encryption program interface, and also enables access to destination books which create lists of destinations. A Help menu 54 accesses usage instructions.

A Change button 55 accesses destination books. A Browse button 56 facilitates finding previously created file packets. The packets are displayed in a dialog box that appears when the Browse button 56 is selected. A Previous button 57 returns the display to the previous display screen. A drop down list 58 displays candidate destinations from which the user may select the destination to which files will be sent. A Send button 59 initiates a transfer of selected files to the selected destination.

Another procedure for sending a selected file to a selected destination is now described. While the user is working within an application program, the user may save the working file to a directory associated with a particular destination, i.e., destination linked directory (DLD). Files may be saved to the directory utilizing a Save As option, or may be automatically written into one or more DLDs as automatic output from a companion application program. Subsequently, all files within the directory (i.e., DLD) to which the files were saved are sent to the destination associated with the directory. In a preferred embodiment, the transfer occurs immediately after the file is saved. However, the transport interval may be set for immediate or delayed time periods. Thus, by saving files to the directory associated with the particular destination or group of destinations, the files will be sent to that destination or group of destinations without additional user action. Multiple directories, each associated with a particular destination, may also be employed allowing the user to select the destination to which the file will be sent. These directories may be created at the time a destination is defined in the destination book by the user. DLDs enable integration of the present invention with other application programs at the operating system level without the use of an application programming interface (API).

Whenever a file is written into a DLD, the file is sent to the destination that has been associated with the DLD, then deleted from the DLD. A user option allows the file to be written into the DLD and then saved into an archive file other than the DLD before the file is deleted. The present invention allows the user to create multiple directories associated with destinations and store them in the destination book. Whenever a user places a file in one of those directories, it is sent to the associated destination. This enables seamless interfaces between large groups of computers over wide area networks. Computers that generate large numbers of files (such as invoices) requiring distribution to a large number of recipients can be automatically and directly linked to the destination computer using DLD structures.

The receiving computer that receives the transfer from the DLD must be actively connected to a communications pathway accessible to the sending computer. If the receiving computer is not actively connected, the sending computer can repeatedly attempt to transfer the file. In a preferred embodiment, the attempts stop after a user selected time-out period elapses. Alternately, the sending computer may wait until it is determined that the receiving computer has become connected. The receiving computer receives the files in a directory designated to receive files by the receiving computer's user. A discrete connection is established for each file transfer initiated with each receiving PC, as described above.

Figure 25:
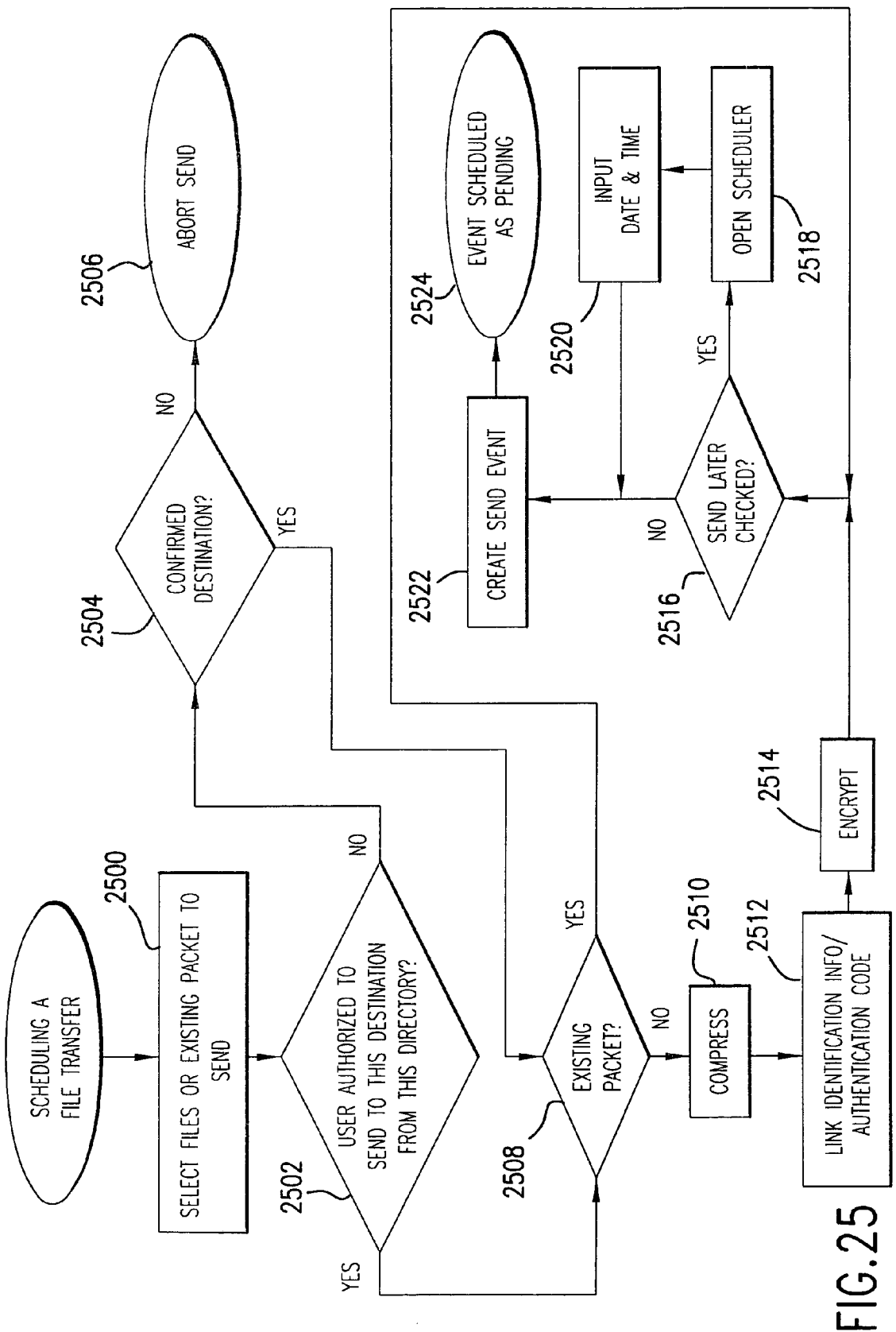
FIG. 25 is a flow diagram of exemplary logic of a send file scheduling module, according to an aspect of the present invention.

Referring to FIG. 25, an exemplary process for scheduling a file send event is now described. Initially at step 2500 a file/packet and destination are selected according to one of the procedures described above. Next, at step 2502 it is determined whether the user is authorized to send the selected file to the selected destination. If authorization is not confirmed, at step 2504 the user is asked to confirm that the selected destination is the destination to which the user actually intends to send the file. If confirmation is not received, at step 2506 the file transfer is aborted. Otherwise, and also when authorization occurs at step 2502, at step 2508 it is determined whether a previously established packet is being sent. If the packet has not yet been established, at steps 2510, 2512, and 2514 the packet is compressed, link identification information and authentication codes are created, and the packet is encrypted.

After the compression, and also when it is determined that the packet already exists, at step 2516 it is determined whether the file transmission is to occur now or later. If the transfer is to occur later, at step 2518 a scheduler is opened, and at step 2520 the user inputs the date and the time when the file transfer should occur. Subsequently, and also when the file is to be sent immediately, at step 2522 a send event is created.

Finally, at step 2524 the send event is scheduled as a pending event in the main control module. At this point, the computer program treats the file like any other pending event set up by the user. The program is constantly in the process of monitoring the queues and sending any pending events found with a time that is earlier than or equal to the current time.

Setting Up a Destination: FIG. 17, FIG. 18 & FIG. 19

In preferred embodiments, a user function is provided to invoke a destination window, with which one or more destination files may be created. The destination window may be used to select a destination file and to add, delete or modify destinations in a destination file. A destination address may be selected from a destination window by the user for use by a control module to transmit a packet. In preferred embodiments, a user function is provided to invoke a dialog window from which the user may set a specific date and time when a control module will initiate transmission of a specific packet.

In preferred embodiments, a user function is provided to add destination PC addresses as nick name objects in a destination window. The nick name objects added to the destination window are linked to the specific destination addresses contained in the destination file. Preferably the number of possible destination addresses allowed as destination targets for a sending PC is controlled by setting a preset non-user-adjustable limit (a locking limit) in a control module for the number of entries allowed in the destination file. Also, the number of destination files allowed for a sending PC is controlled by setting a locking limit in a control module for the number of destination files that can be created or viewed. The locking limit may be preset in the software by the software developer/manufacturer during installation disk production before the software is shipped to a user for installation onto the computer.

In preferred embodiments, a user function is provided to invoke a dialog window that enables modification of a destination address from a destination window. Moreover, a user function is provided to invoke a dialog window from which the user may create or select for display additional destination windows. In preferred embodiments, a user function is provided to launch a file structure display window from a destination window.

According to a preferred embodiment, a discrete destination and associated address can be defined or modified, and saved in a destination file by user interaction with a control window such as that shown in FIG. 18. Once defined and saved, a destination file can be selected and displayed in a destination window such as that shown in FIG. 19, and can be linked to a destination object in a destination window such as that shown in FIG. 17. A destination file can also be linked to a directory to create a DLD.

A procedure is now described for adding or modifying a destination according to a preferred embodiment. The Setup menu 53 is selected to access the window shown in FIG. 18. Then, the user selects the New button 40, or selects a destination and selects the Edit button 42. Clicking on button 40 results in a dialog box display that enables entry of destination information comprising name, address, address type (e.g., PSTN number, IP address number), or creation of groups of destinations. A group of destinations allows a file transfer to be made to all destinations within the group with a single user action. Button 42 is used to edit parameters of an existing destination. Clicking on the Edit button 42 results in a dialog box display that enables modification of destination information.

For modem destinations, the user enters the telephone number of the modem destination. For Internet addresses, the user enters the IP address of the destination. After inputting the information, the user selects a Finished button 48 and the destination is added to the destination book. The Finished button 48 closes the destination book window. A box (not shown) may also be checked causing a destination linked directory to be setup for the destination. A default name for the DLD may be set to the destination's nickname or the full destination name.

The present invention preferably stores all information about a destination in the destination book that is portable from one computer to another and easily shared among users. Destination books provide an easy way to send a file to a group of users. The user simply selects the group as the destination of the data file containing the destination book information. The present invention then sends the file to all users in that group.

A Remove button 44 removes listed destinations. An Add to Group button 46 creates groups of destinations that allow a file transfer to be initiated to multiple destinations with a single user action.

Figure 17:
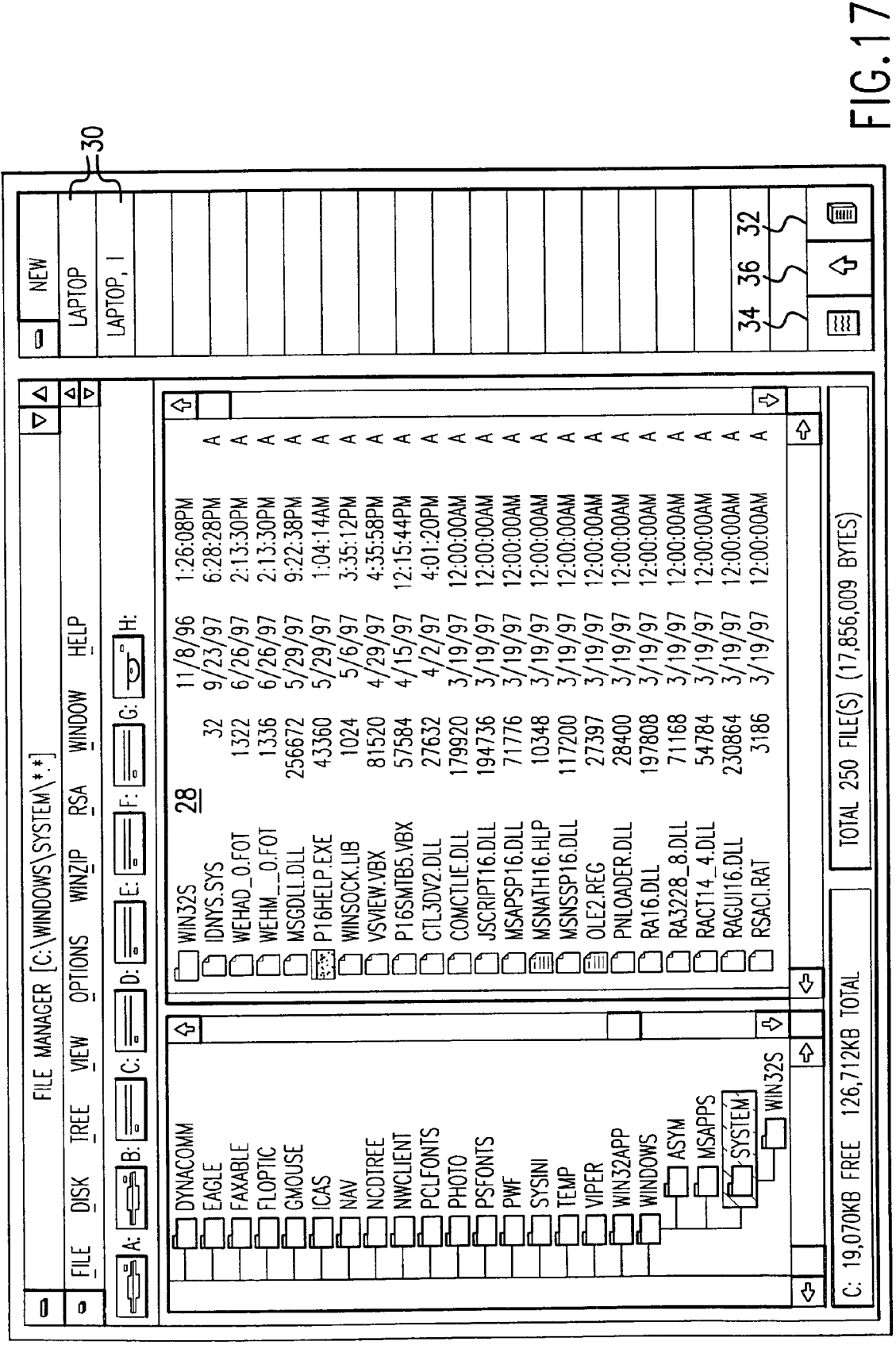
FIG. 17 illustrates examples of the transmit window for selecting files to transfer, and the destination window for selecting destinations to transfer the file to, according to an aspect of the present invention.
Figure 18:
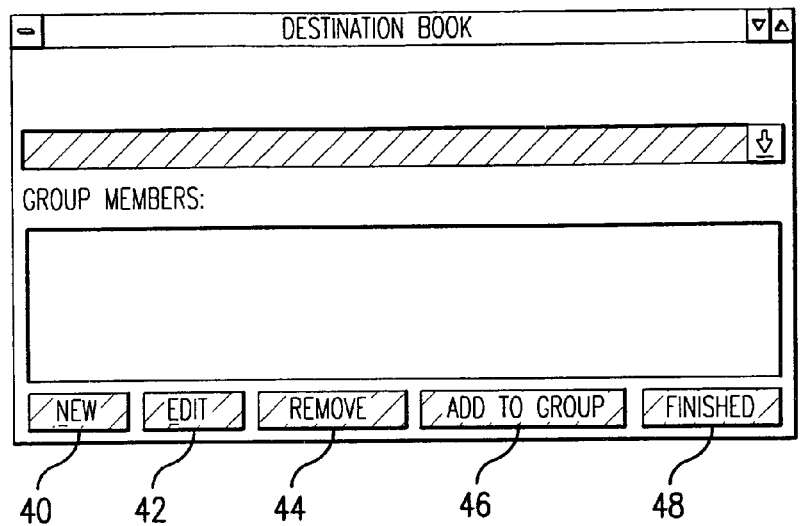
FIG. 18 shows an example of an add/edit destination window for adding and editing the destination addresses in the destination window, according to an aspect of the present invention.

In order to add a destination to the destination bar, such as that shown in FIG. 17, a user may right click on a destination object 30 if the destination object 30 is empty (i.e., not associated with a destination). In response to the right click, a drop down box appears that lists destinations defined according to the procedure described above. The user may then select a destination from the destination list and change a nickname associated with the destination, if desired. Consequently, the nickname will appear in the destination bar if the destination object 30 is not empty (i.e., not previously associated with a destination). The modifications to destination parameters are then saved in a destination file.

Creating an Index: See FIG. 6 & FIG. 22

In a preferred embodiment, the user may create an index of files stored on the PC's file storage device that can be requested by other PCs across a connected communications pathway. The index is created by selecting files from the file list window. The file names and file structure are then added to an index file in a display window by the control module.

In preferred embodiments, a user function is provided to invoke an index request sequence in which a user may select a PC destination to which an index request will be sent. Upon selecting a PC destination for an index request, a control module initiates transmission of the index request, the identification, and the address of the requesting PC. The PC destination that receives the index request checks the requesting PC's identification for authorization, and then returns the index linked to the requesting PC (assuming it is authorized) to the address received from the requesting PC. Upon receipt of the index, a control module stores the index linked to the associated destination address in an index file on the receiving PC's file storage device. In a preferred embodiment, indexes may be requested from multiple PC destination addresses.

In a preferred embodiment, the user may create one or more indexes of files stored on the PC's storage device. Each index created may then be linked to a specific destination address (i.e., a private index). Still further, an index linked to a specific destination address, which may include identifiers such as user name, identity or site code, serial number, etc., is the only index that will be transmitted to a requesting destination PC having that specific destination address. The private index capability enables users to retrieve files from another computer without allowing the user to login or control the computer that has the desired files. Thus, the private index reduces security risks.

Moreover, an index linked to no specific destination address (i.e., public index) will be transmitted to any destination address. In other words, the public index is accessible by all users. In other preferred embodiments, the index is created by selecting, from the destination dialog window, the destination address desired to be linked, and then selecting files from a file list window. The files names and file structure are then added by the control module to the destination linked index file and an index display window.

In other preferred embodiments, a user may encrypt the packet containing the files in the file list to be passed to the pending event log file. The control module calls an encryption subroutine which encrypts the packet containing the listed files. Using commercially available encryption software having "public key/private key" technology, a public key code may be used to encrypt files. The public key code is linked to the destination address to which the files are to be sent. The public key code for each destination address is generated from a private key code, both of which are generated and linked to the destination address during system setup at each PC destination. The public key code, but not the private key code, created for each PC destination, can be received by each system PC automatically upon request from another destination PC. The public key code linked to a destination is used for encryption of files to be transmitted to that destination. Only the private key for a specific destination can be used to decrypt files encrypted with the public key for that destination. Files received at a PC destination that were encrypted using the public key for that destination are decrypted automatically using the private key for the receiving PC.

In still other preferred embodiments, encryption programs may be invoked by the user to encrypt files, manually selecting the appropriate public key, prior to selection for transmission to a destination PC. Decryption programs may also be invoked by the user to decrypt files with a private key code manually selected after receipt of the files. Automatic encryption and decryption without public key exchange may be used. Such encryption technology does not use public key/private key technology, but rather a "one time pad" encryption key. The present invention provides a user option that allows a user to select a security product that the user wishes to utilize. It also provides the option to use a TriStrata Security Architecture that provides centralized security policy management eliminating the requirement for public key exchange, and provides very fast encryption and decryption. TriStrata Security Architecture is a developer's kit publicly available from TriStrata Security, Inc. of Redwood Shores, Calif.

In a preferred embodiment, a user function is provided to invoke a file request sequence that allows the user to request files from a selected index in order to request files from the associated destination PC address. Still further, when one or more files listed in the index are selected by the user, a control module initiates transmission of the request for the files along with the identification and address of the requesting PC. When a PC destination receives a request for one or more files in an index, a control module calls a compression subroutine which copies and compresses the files contained in the received request, creates a packet file and passes the packet to the pending events file. In another preferred embodiment, if automatic encryption is invoked, packets containing the compressed files are encrypted using a public key linked to the requesting destination or a one time key linked to the exchange transaction. A preferred compression algorithm (compress.dll) is publicly available from Infozip Group. Other compression algorithms are commercially available and may be used in preferred embodiments.

A control module initiates a connection with the destination PC using the destination address received with the file request. Still further, a control module identifies the sending PC by its address, then transmits the packet containing the compressed requested files to the linked address across the connected pathway. When the transmission of the packet is complete, the control module indicates a successful transfer in the event log window by date, time and content. In preferred embodiments, a control module responds to inbound file transmissions, captures, decompresses, and writes transmitted files to the computer file storage device using the received associated file structure, and creates a received file list that is linked to the stored files and displayed in the event log window showing date, time, and content.

According to a preferred embodiment, the user of any interconnected PC of the present invention can create an index of files from which another designated PC can request files. Moreover, multiple indexes can be created, each authorizing a request from different interconnected PCs and comprising different file lists. The multiple indexes are established by associating each index with a specific destination, and then selecting files to be listed in the index. Thus, different files can be in each index. In a preferred embodiment, a volume name (disk label) is utilized for an index authorized for transmission to any requesting PC. Alternatively, the destination name, destination address, internal serial numbers, or authentication codes can be utilized to restrict transmission of each index created to a specific destination PC. The index is created by user interaction with control windows such as those shown in FIG. 22.

Figure 22:
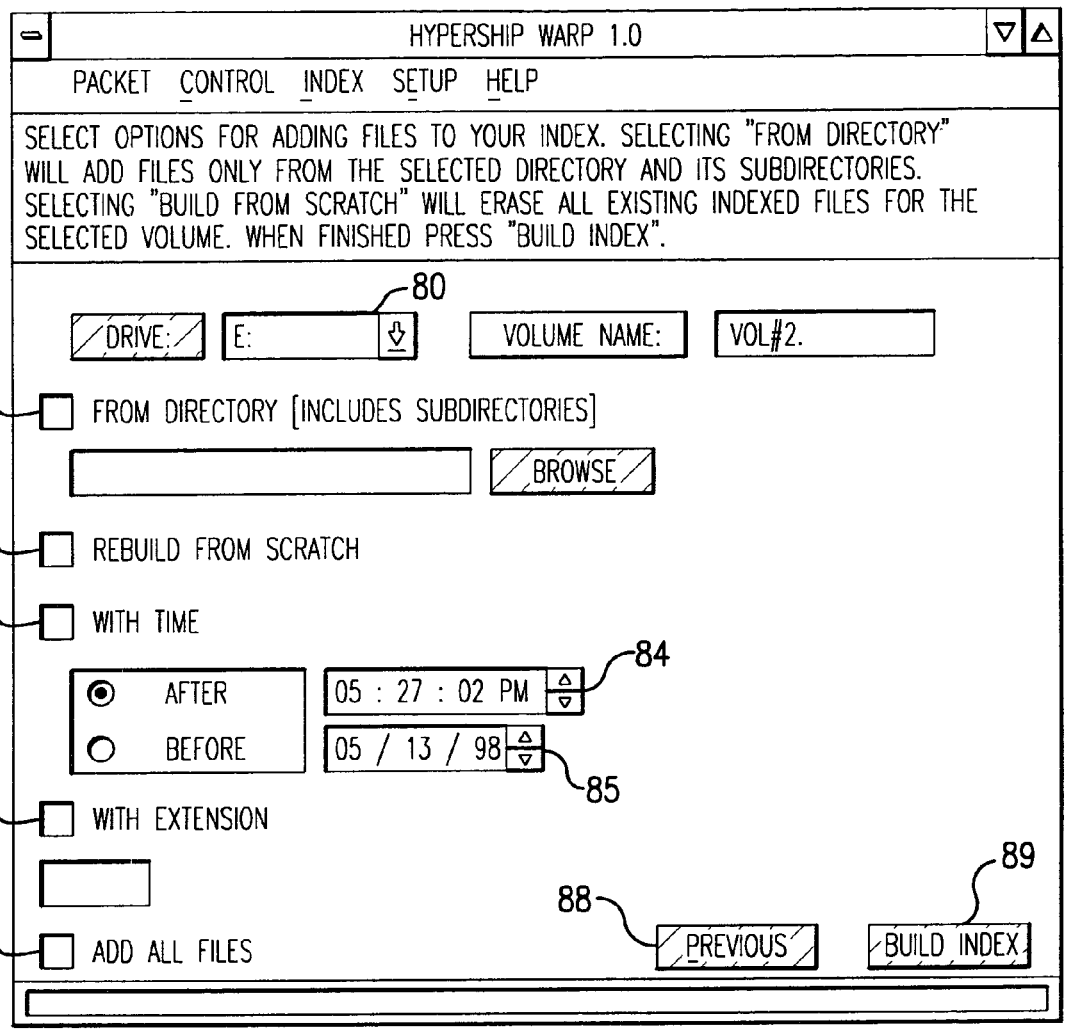
FIG. 22 shows an example of a build index window for creating the index of files that can be requested by a destination PC, according to an aspect of the present invention.

In FIG. 22, a Drive button 80 displays a drop down box that enables selecting a drive from which the files to be indexed can be selected. Checking box 81 allows building an index that contains the content of a specific directory tree. Checking box 82 enables rebuilding a specific index. Checking box 83 enables building an index containing files before or after a specific date and time. Button 84 varies the reference time for the index from the current time displayed. Button 85 modifies the reference date for the index from the current date displayed. Box 86 enables building an index containing only a specific file extension (e.g., "doc"). Box 87 enables building an index containing all files on a logical drive. Button 88 returns to the previous computer program screen. Button 89 initiates the build index process using the parameters selected by designation of boxes 81 through 87.

The index created comprises a database tree including linked lists of operating system file block structures. These structures are utilized by operating systems to store information about the file, and its state. Each node of the tree contains pointers to its siblings, and to its children and parents. In this way, the index retains the directory structure information. When a file is added to the index, each level goes into the tree.

An example for adding a file to the index is now described. Consider the file report.txt with its associated drive and directory structure being E:\sky\clouds\bird\report.txt. When adding the file to the index, "E:\" is not utilized, because only the structure of the directory, and not of the drive is important. Therefore, the database is searched for "sky", starting at the root of the database and moving across the siblings. If "sky" is not found, it is added to the list, preferably keeping the list in alphabetical order. Subsequently, the search for "clouds" begins with the first child of the "sky" node, moving across the siblings. If "clouds" is not found, it is added to the list, preferably keeping the list in alphabetical order. The process repeats with the first child of "clouds" and the search for "bird" commences. The same process executes with "report-.txt." The process is highly recursive because the process is repeated for each level of indenture of the directory tree until the file name is reached. Filename nodes in the index have no children, but may of course have siblings.

Figure 6:
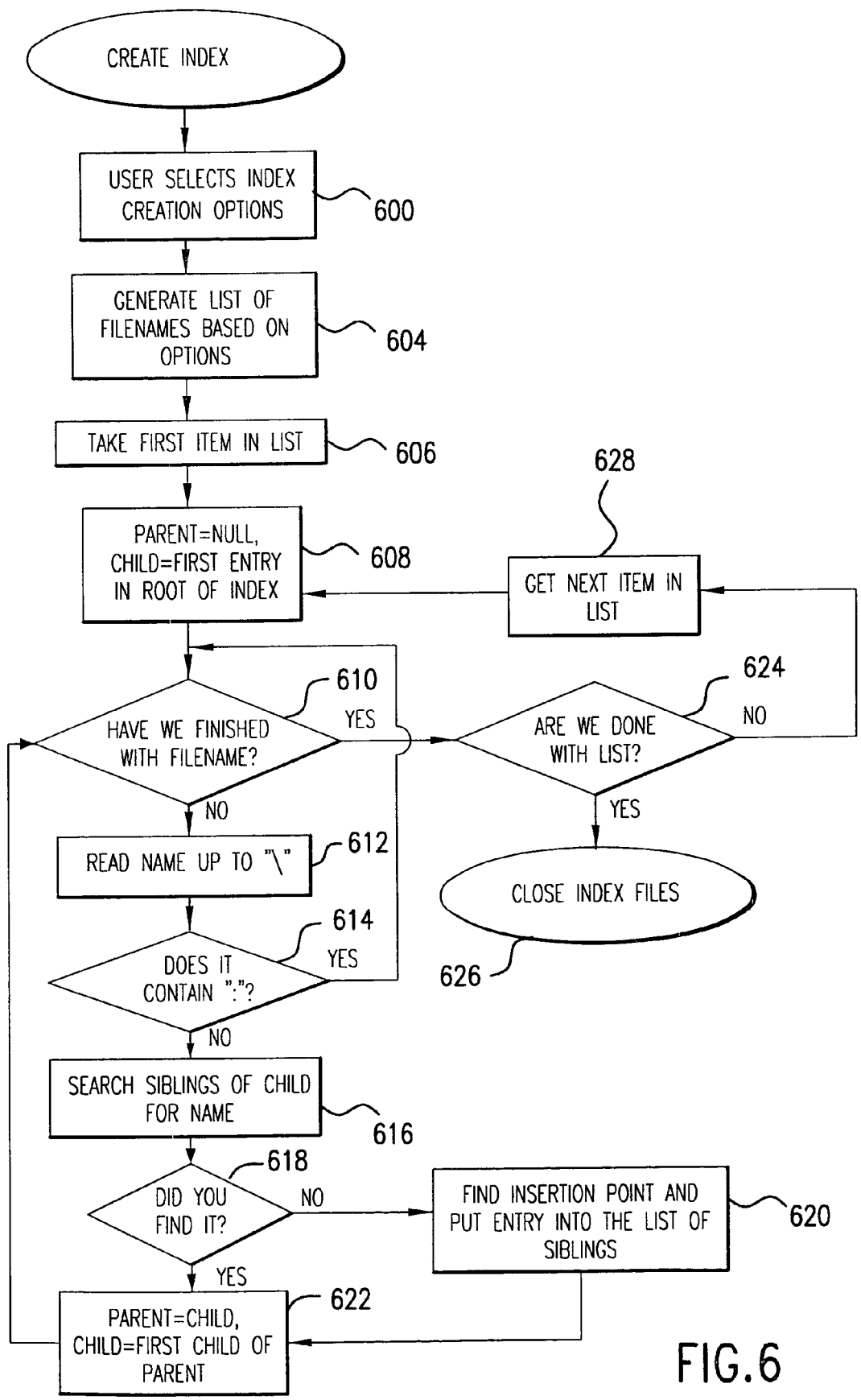
FIG. 6 is a flow diagram of exemplary logic of a create index module which creates an index of files that the user wishes to make available for request from another PC, according to an aspect of the present invention.

The process for creating each index using a control window, such as that shown in FIG. 22, is now described with reference to FIG. 6. Initially at step 600 the user indicates that an index is going to be created. Then, at step 604 a filename list is generated based upon the user selected options. For example, if From Directory is checked, the user can select specific files names to be included in the list. If other options are checked, the list is generated with the file structure based on the options selected.

At step 606 the first name in the list is determined. Then, at steps 608-622 the index structure is recursively built until the name is included in the list. When it is determined at step 610 that the file name has been added, at step 624 it is determined whether the list has been completely built. If the list is finished, at step 626 the logic terminates. Otherwise, at step 628 the next item in the list is determined and the process repeats at step 608.

Requesting a File or an Index: See FIG. 7, FIG. 8, FIG. 19 & FIG. 23

Figure 23:
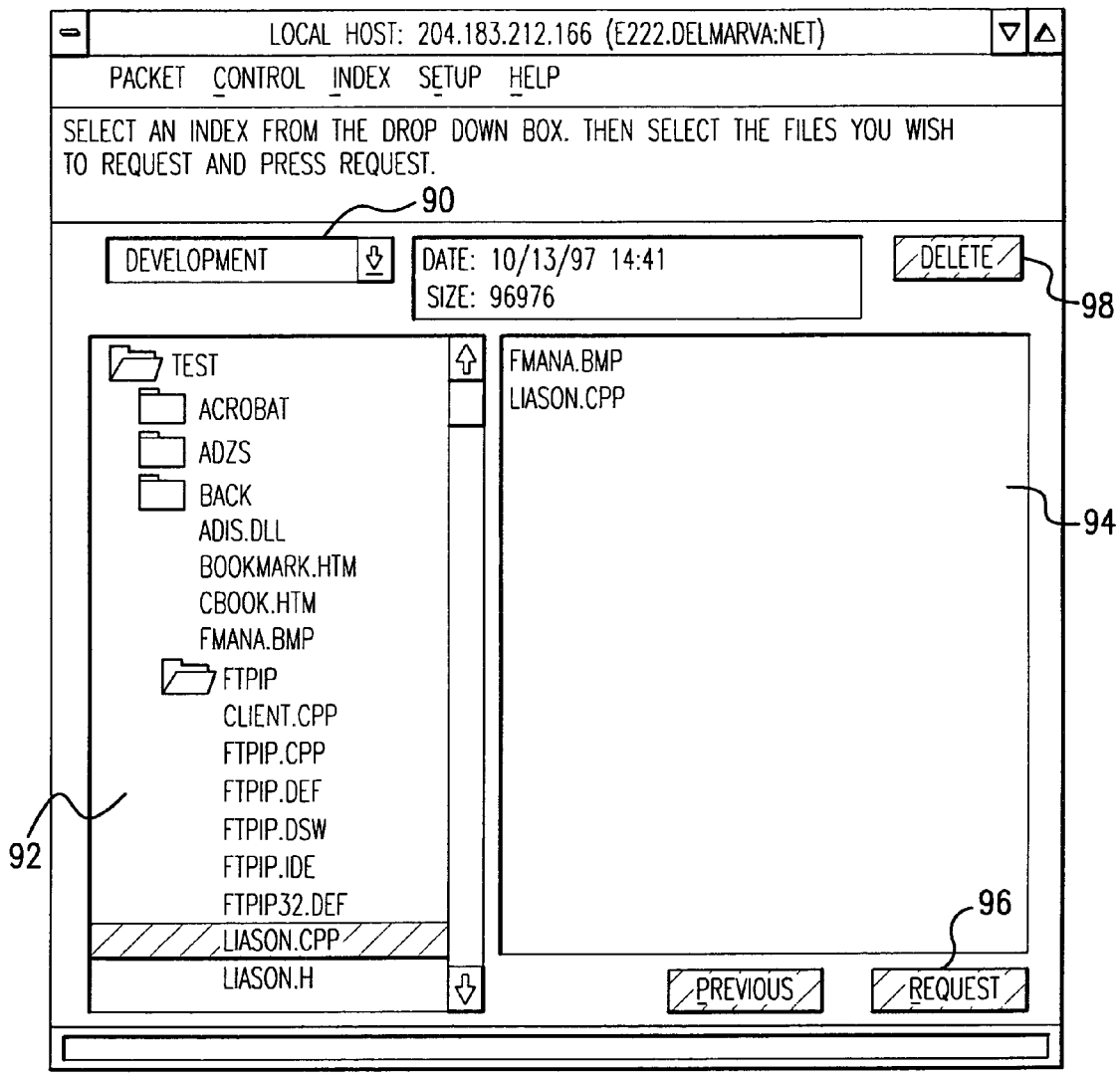
FIG. 23 shows an example of a request file window for requesting files from another PC, according to an aspect of the present invention.

According to a preferred embodiment, the user at any interconnected PC of the present invention may initiate a file or index request event by interacting with control windows, such as those shown in FIGS. 19 and 23. A file request event is initiated by using the PC's pointing device to select an index from a displayed list in a control window, such as that shown in FIG. 23, then selecting files listed in the index, and invoking a request event. The user can initiate an index request event by invoking a request control from the Index menu 52 in a control window, such as that shown in FIG. 19, and then selecting the destination from which the index is to be requested.

The computer program links an index request to the destination address associated with the selected destination, and then schedules a send event in the pending event file. The identification and address of the requesting PC is sent as part of the request. In the present invention, the computer program in each PC receiving an index request will return only an index specifically created and authorized for the requesting PC, unless the receiving PC has an index created and authorized for general distribution to interconnected PCs. Further, a file request can only be initiated from an interconnected PC after downloading one or more indexes from other interconnected PCs.

Figure 7:
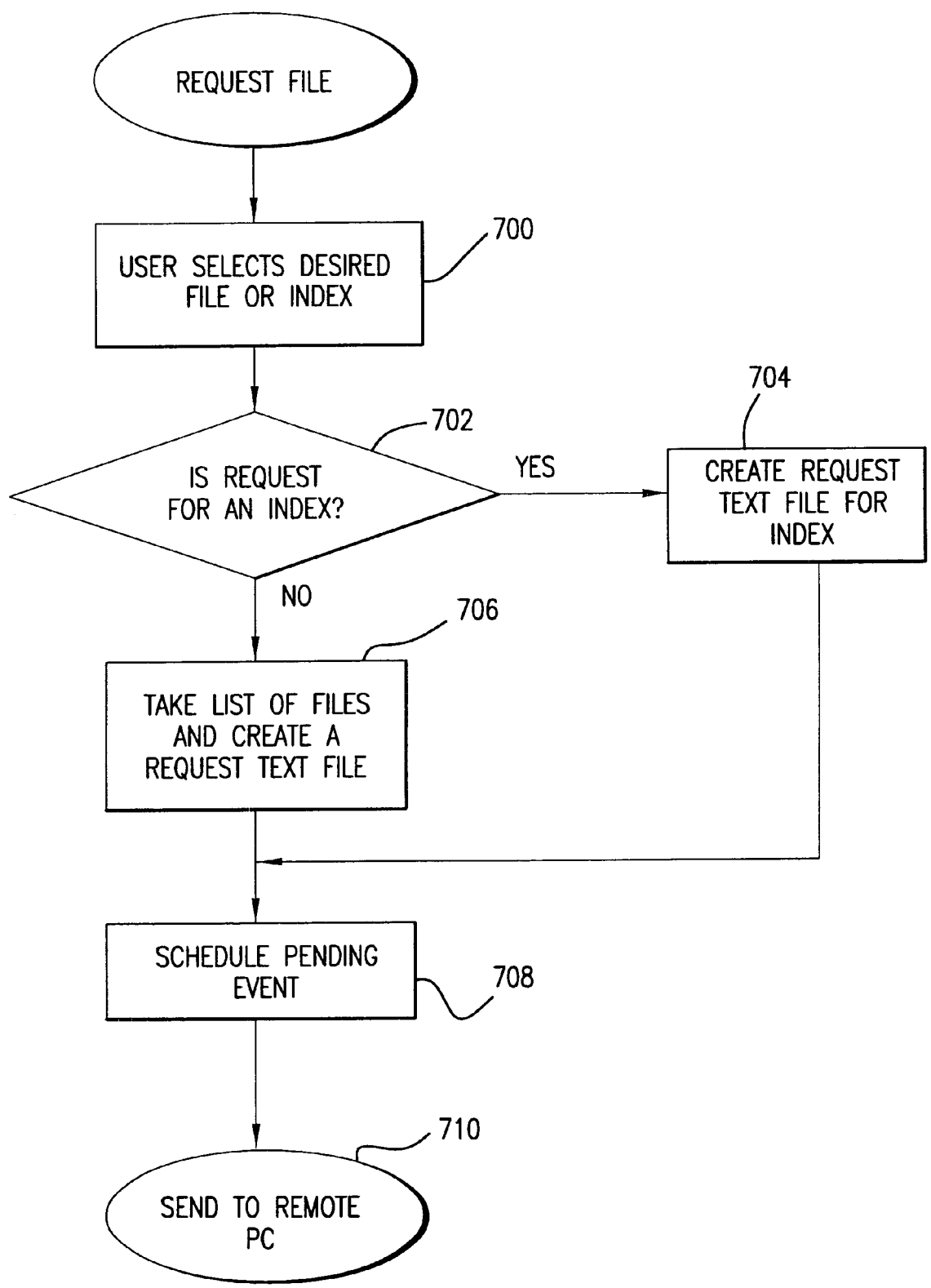
FIG. 7 is a flow diagram of exemplary logic of a request file module which creates a request file pending event in the main control module, according to an aspect of the present invention.

Referring to FIG. 7, exemplary logic for requesting a file or an index is now described. Initially, at step 700 the user selects the files desired from a remote index previously downloaded or selects an address from which to download an index. Then, at step 702 it is determined whether the request is for a file or an index. If an index has been requested, at step 704 an index text file is created. Alternatively, if a file is requested, at step 706 a file list text file is created. Then, after steps 704 and 706, the newly created text file is scheduled as a pending event that will be sent by the send file module of FIG. 3. Finally, at step 710 the logic terminates execution. Because the program is always waiting for files, the program is waiting for a request return.

Figure 8:
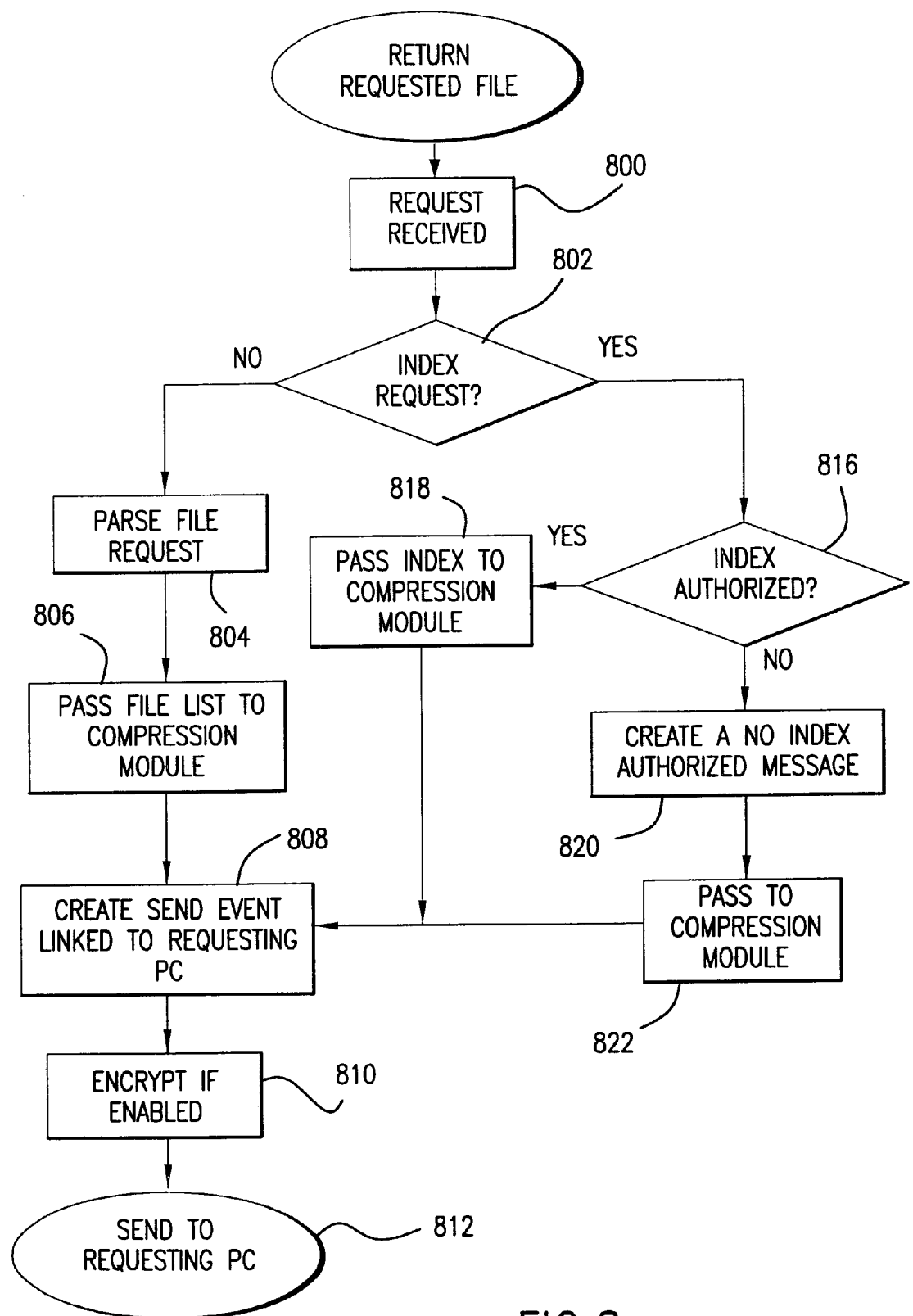
FIG. 8 is a flow diagram of exemplary logic of a return requested file module which processes requests for one or more files, or an index, and creates pending events to return the requested files or indexes in the main control module, according to an aspect of the present invention.

Referring to FIG. 8, exemplary logic that executes on the receiving computer is now described. Initially at step 800 the receiving computer receives a text file containing a request. Then, at step 802 it is determined whether the request is for an index. If the request is not for an index, the request is parsed at step 804, and the files are located. Subsequently, at step 806 the requested files are compressed, and at step 808 a send event linked to the requesting PC is created. After the event is created, at step 810 encryption occurs if encryption has been enabled, and at step 812 the files are sent to the requesting PC in accordance with the procedure described with respect to FIG. 3.

If at step 802 it is determined that an index has been requested, at step 816 it is determined if the requested index is authorized for transmission to the requesting PC. If the index is authorized, at step 818 the index is compressed and the logic proceeds to step 808 for transmission as previously described. If the index is not authorized, at step 820 a message is created which informs the requesting PC of the denial. Subsequently, at step 822 the message is compressed and sent to the requesting PC at steps 808-812.

In FIG. 23, a button 90 displays a drop down box that enables selection of an index received from any PC listed in the destination book. The files contained in the selected index are displayed in a display field 92, along with the associated file structure. Files are selected for request by clicking on the listed files with the PC's pointing device. Selected files are displayed in a display field 94. Clicking on a Request button 96 initiates the request of the selected files from the PC from which the selected index was received. A Delete button 98 deletes an index, usually when a new, more current index has been requested to replace the index being deleted.

The present invention can also include an auto polling feature that provides the ability to poll groups of destinations all at once and simultaneously receive all files transferred as a result of the poll. Auto polling is enabled when the user places files in a directory corresponding to a remote destination. The remote destination can subsequently poll that directory causing those files to be transferred to the remote PC. Auto polling is similar to the index function previously described, except that with auto polling the remote PC does not request specific files, all files in the directory are sent to the remote machine upon polling. Due to the ability to have multiple, simultaneous connections, a computer polls all remote machines in parallel. Parallel polling provides the advantage that many files can be received from many different locations quickly. The return receipt feature described below can be utilized with the parallel polling feature to provide additional benefits.

In a preferred embodiment, if an improper computer polls a directory to trigger a transfer, the transfer occurs. However, the transfer will not be to the improper user. The transfer will go to the computer associated with the directory being polled.

Automated Update

According to another embodiment, an automated update feature may be provided. The automatic update feature allows the user to electronically receive new software version releases and automatically install the software updates. Options are provided for automatically or manually updating upon receipt of electronic transmission of a new software version release.

When an update is transmitted to recipients, if automatic update has been selected during setup at a recipient PC, the previous version installed at the recipient PC is automatically replaced by the new release version files. Automatic update is accomplished by transmitting, along with the new release version computer program, (1) an update identifier in the file list header for the packet that differentiates the update package from other types of received files; (2) an authentication code unique to the software manufacturer; and (3) an install program and a set of control commands that are executed by the currently installed version of the software. Depending upon the specific requirements of the new release, the control commands may terminate operation of the current version, copy new files, and/or install modifications required for operation of the new version. The operation of the new version is initiated by either the control commands or the install program for the new version, depending upon the extent of the upgrade. The install program will preferably unlink DLLs, copy new DLLs, copy new executable files and run the new program version. Ultimately, the install program terminates itself.

If manual update has been selected during setup at the recipient PC, the electronically received software updates are saved on the recipient PC's storage device with the same file structure as the sending PC's file structure. The user at the receiving PC can manually initiate the install routine for the new release version at a later date when installation of the update is desired.

Credits: See FIG. 9, FIG. 11, FIG. 12, FIG. 13 & FIG. 24

Figure 24:
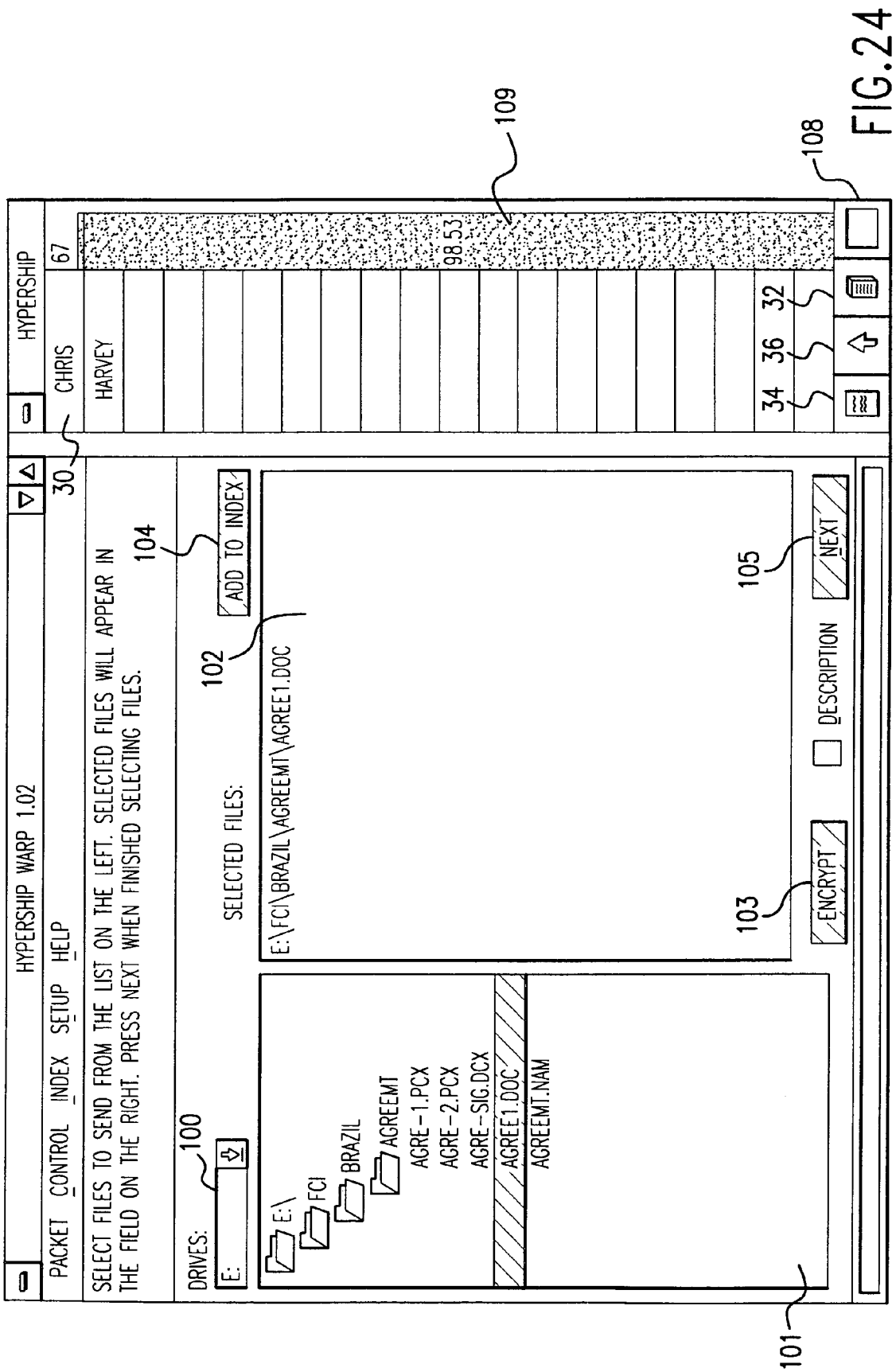
FIG. 24 shows alternative examples of a transmit window for selecting files to transfer, and the destination window for selecting destinations to transfer the file to, along with a transport credit bar and credit request button, according to an aspect of the present invention.

Another embodiment of the transmit window and destination bar is shown in FIG. 24. A Drives button 100 enables selecting the drive where the files desired to be sent are stored. When a drive is selected, the directory structure is displayed in a display field 101, showing directories, subdirectories and files. When files are selected using the pointing device, the selected files are displayed in a display field 102, along with the corresponding file structure. Clicking on an Encrypt button 103 calls an encryption application program for encrypting the files with the public key for the destination where the files are to be sent. An Add to Index button 104 enables adding the selected files to a specific index. Clicking on a Next button switches to the select destination window (FIG. 19).

If the user left clicks a destination object 30, the selected files are sent to the associated destination address, after being prompted for confirmation of the destination selected and whether a delivery confirmation receipt is requested. In a preferred embodiment, the viewer may select confirmation receipt as either direct or through a third party authenticator. Button 108 initiates a request for transmit credits, by displaying a dialog box that prompts the user for the number of credits being requested and user account information. Display bar 109 (a.k.a., fuel gauge) indicates the number of transmit credits remaining.

According to another preferred embodiment of the present invention, a credit system may be employed. The credit system controls the number of transmissions a specific sending PC may send. The credit system operates by setting a value of an adjustable locking limit, then decreasing the value of the locking limit by a predetermined amount after successfully completing each file transmission. The locking limit value may be decreased until the value reaches zero, in which case no further transmissions are permitted until the locking limit has been reset to a value other than zero. In other words, a certain number of credits may be provided at the specific sending PC and the number of credits decreases after each successful file transfer until no credits remain. The file transfer function is suspended at the specific PC once the value of the incrementally modified locking limit at that PC reaches a null value. In other words, no transfers are allowed after the credit balance reaches zero. Therefore, before any transmission occurs, the send file module, shown in FIG. 3, checks the credit balance to determine if the sending PC has enough credits for the requested transmission. If an insufficient balance is found, a message is sent to the user indicating the balance is insufficient, along with instructions as to how to obtain additional credits. A message may also be displayed indicating when the number of credits drops below a certain predefined level advising the user to obtain additional credits. According to another embodiment, a transaction count increases after each successful file transfer, and no further transfers are permitted when a predetermined maximum number of transactions is reached.

According to another embodiment of the present invention, the file transfer function is restored by resetting the locking limit to a value other than the null value, i.e., obtaining additional credits. The user obtains additional credits by invoking a user authorization request. To initiate a request for credits, the user clicks on the request button 108 (shown in FIG. 24.), and is subsequently prompted for appropriate account information. If the information has been entered previously, an opportunity is provided to edit the information before sending it. The number of credits being requested is also collected, either automatically (e.g., a default amount) or through user prompts. Exemplary accounting information that may be collected includes a credit card number, or an account number indicating the requester, e.g., a business account. Thus, to obtain credits, the user must either have set up an account before requesting credits and provide an account number with each credit request, or alternatively, provide credit card information. Preferably the accounting information and the number of credits requested along with the sending PC's identity authentication and IP address or telephone number are transmitted to an independent authorizing computer system 16 (credit processor) (FIG. 1) using the previously described file transfer method, through a connected communications pathway. The request is sent to a specific credit processor 16 at a specific, fixed IP address previously provided to the sending computer. According to another embodiment, the user's credit can be established by inserting an authentication device into the PC's floppy drive or a device reader. Consequently, the PC reads the information from the authentication device.

After the authorizing computer system 16 receives the authorization request, the connection between the requesting computer and the authorizing computer system 16 terminates and the authorizing computer system 16 begins processing. After completing processing, the authorizing computer system 16 contacts the requesting computer via the standard listening port and indicates denial or the number of credits approved without establishing an additional connection. Only a single connection is utilized for this message for security reasons. Upon validating the accounting information, the credit processor returns an authorization and transmission control code to the requesting PC corresponding to the number of file transmissions authorized. Preferably credit processors do not store and forward files, nor process file transmissions.

Figure 9:
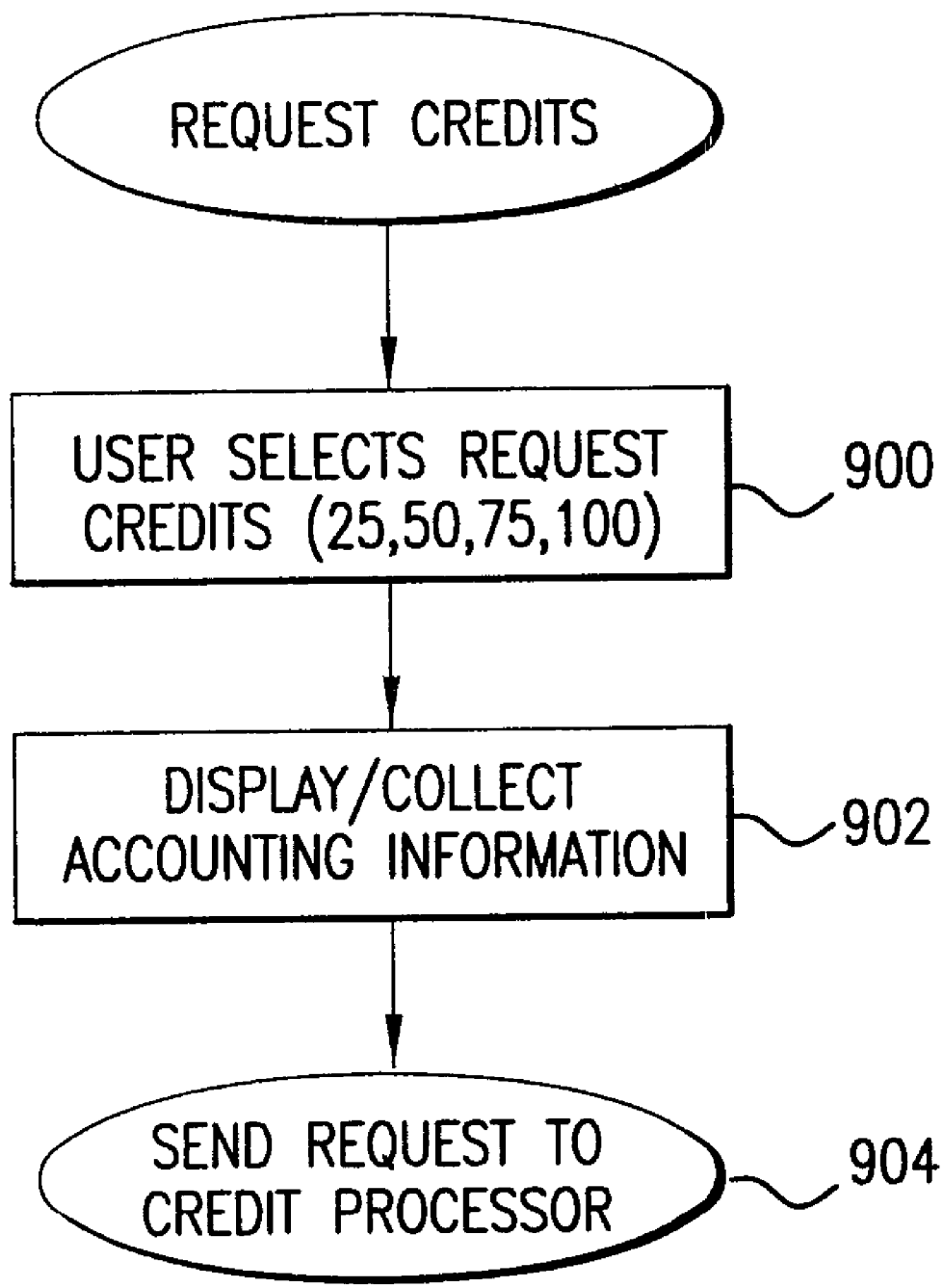
FIG. 9 is a flow diagram of exemplary logic of a request credits module which collects accounting information and the number of file transmissions to be authorized, and creates an authorization request pending event in the main control module, according to an aspect of the present invention.

Referring to FIG. 9, exemplary logic for requesting credits is now described. At step 900 the user selects the number of credits desired; in a preferred embodiment 25, 50, 75, or 100 credits. Then, at step 902 the account information is displayed (if previously provided) and edited, or collected (if not previously provided) via prompts. Finally, at step 904 the request is forwarded to the main control module for transmission to the credit processor 16.

At least one authorizing computer system 16 should be provided for the purpose of authorizing and issuing credits, processing the accounting information received in the authorization request and, upon validation of the accounting information, informing the requesting PC of the successful validation of the accounting information. If the validation of accounting information is unsuccessful, a message indicating the denial may be returned to the requesting PC causing a message to be displayed indicating the unsuccessful credit request. Preferably, the credit processor 16 is a special computer set up exclusively to process credit requests by validating accounting information. No document files are transferred through the credit processor 16, and there is no provision nor requirement for login. The credit processor 16 is setup at a specific IP address and processes the accounting information received in the authorization request for credits.

Figure 10:
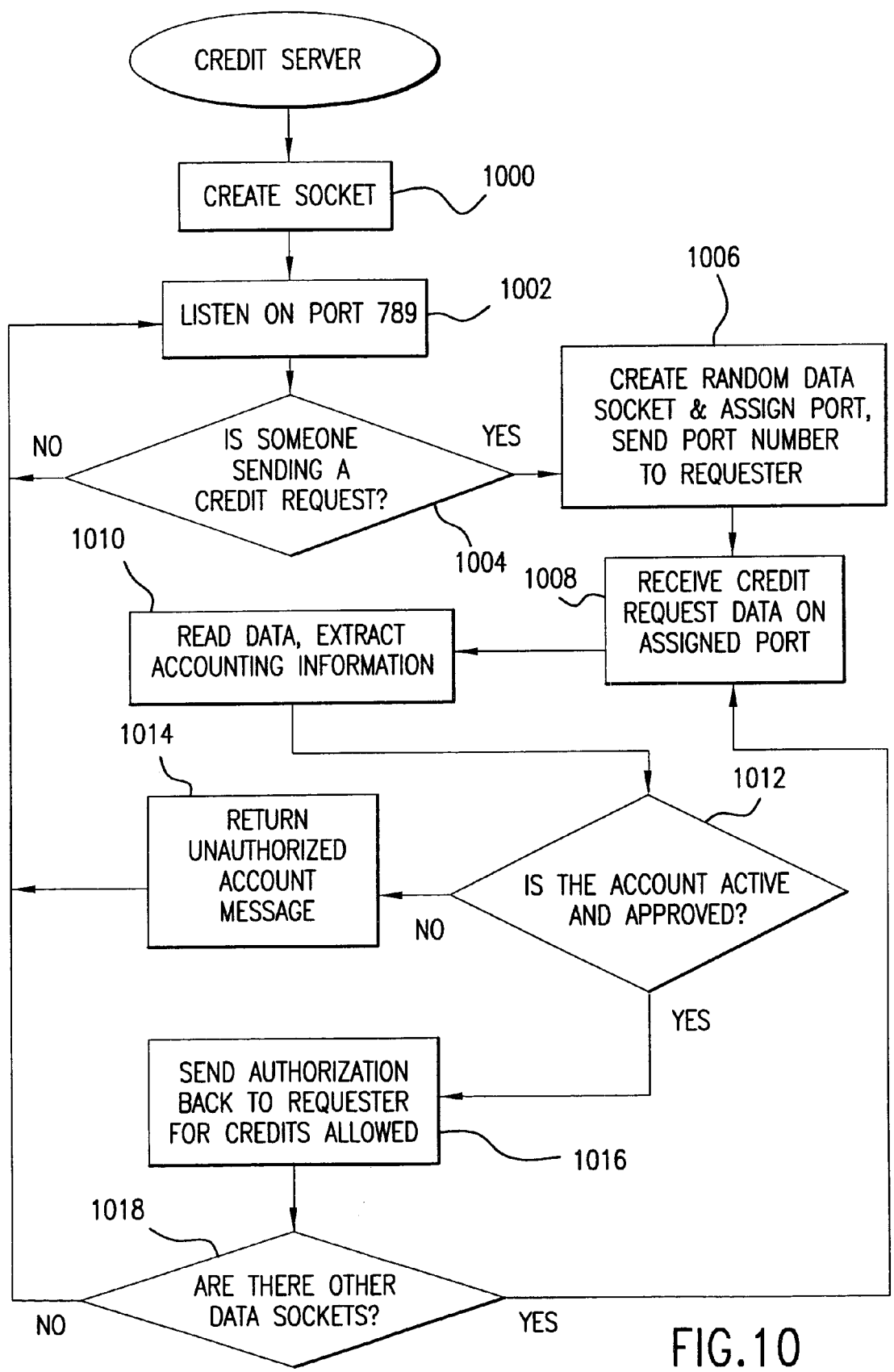
FIG. 10 is a flow diagram of exemplary logic of a credits request processing module which operates on a credit server, according to an aspect of the present invention.

Operation of the credit processor 16 is now described with respect to FIG. 10. At step 1000 a socket is created, at port 789 in a preferred embodiment. At step 1002 the credit processor "listens" for a credit request on port 789. At step 1004 upon receipt of a request, it is determined whether received data represents a credit request. If it is determined that the received data is not a credit request, the logic returns to step 1002. Otherwise, if a credit request is received, at step 1006 a random data socket is created and a port is assigned for receiving the authorization request. Subsequently, at step 1008 the authorization request is received at the assigned port. At step 1010 the accounting information (e.g., account number, credit card number, and expiration date) is extracted from the received data. At step 1012 the account is verified, e.g., the account is checked for validity or the credit card charge authorization process executes. If the account is verified, at step 1016 the authorization for credits requested is returned to the requesting PC on port 789. If, at step 1018 it is determined that additional data sockets exist, the process returns to step 1008 to concurrently process other requests received, as described above. If no other data sockets exist, the process returns to step 1002 and the process repeats. If at step 1012 the account is not verified, at step 1014 an unauthorized account message for requests not approved (e.g., due to no account number, failed credit card authorization, etc.) is returned to the requesting PC.

The authorizing computer system 16 performs standard credit card processing to determine if the cost for the amount of credits requested is available on the submitted credit card. If an account number is submitted instead of a credit card number, the account number is forwarded to a standard accounting system for verifying whether the account is valid and whether the requested amount is available from that account. If the accounting information is validated, a confirmation message is sent back to the requesting PC along with the number of credits authorized. Upon receipt of the confirmation, the requesting PC increases the credits by the number of credits authorized. Alternatively, the authorizing computer system 16 can approve fewer credits than requested.

Upon receipt of credit authorization, the main control module calls the add credits routine, shown in FIG. 11, to add the new authorized credits to the current remaining credits. Referring to FIG. 11, at step 1100 the requesting PC reads the number of received credits returned by the credit processor. Then, at step 1102 the requesting PC decodes the current credit balance remaining. Any known form of decoding/encoding may be used in order to prevent users from tampering with the number of credits contained on their PC. Alternatively, an external device such as a "Smart Card" can be used to store the received credits authorization. At step 1104 the new credits authorized are added to the remaining credit balance. Then, at step 1106 the new credit value is encoded. Finally, at step 1108 the new credit balance is displayed, in a preferred embodiment, on the credit bar 109 shown in FIG. 24.

When a file is transferred by a PC, the main control module calls the remove credits routine, shown in FIG. 12, to modify the remaining credits by one or more credits. According to a preferred embodiment, a different number of credits may be deducted for file transfers of different sizes. For example, file transfers of less than one megabyte may only require one credit per transfer, whereas files greater than or equal to one megabyte may require two credits per transfer.

Referring to FIG. 12, an exemplary process for removing credits for file transfers is now described. At step 1200 the number of credits required for the present transfer is determined. The number of credits required for each file size may be stored in a lookup table. Then, at step 1202 the current credit balance is decoded. At step 1204 the cost of the transaction is subtracted from the current credit balance. Finally, at step 1206 the modified credit balance is encoded, and at step 1208 the new credit balance is displayed.

According to a preferred embodiment, a flat rate billing system is employed. For example, a business may pay a fixed amount for an unlimited number of transfers per month. In order to implement the flat rate billing system, a limit should be set for the total number of credits allowed on each PC at any given time. The number of credits should be limited in case a business subscribing to the flat rate service defaults on the monthly payment. The fixed maximum number of credits prevents the defaulting business from having an excess number of free credits on the business' PC after defaulting and thus receiving extra free transfers. Of course some credits may remain on the defaulting business' PC after defaulting; however, the maximum reduces the loss.

According to the flat rate system, the local machine limits the number of credits requested to keep the machine from exceeding the maximum. For example, if the maximum number of credits allowed is 100 credits, the user currently has 90 credits, and the user requests 50 credits, the requesting PC prevents the request from transmitting. Alternatively, the requesting PC may reduce the request to the number of credits allowed, in this example 10 credits. When the number of credits on a PC subscribing to the flat rate service depletes the credits on the PC, authorization merely determines whether the submitted account number is a valid account, and the number of credits requested will be the number of credits necessary to reach the limit.

According to another preferred embodiment, the number of authorized file transmissions remaining at each PC is dynamically displayed. Thus, the number of credits currently available is displayed, and when the number of credits changes, e.g., due to a file transfer, the change is indicated on the user's display screen. One embodiment of the dynamic display is shown in FIG. 24 as a credit fuel gauge 109 showing the number of credits currently available. The percentage of available credits relative to the maximum number of credits may also be displayed. Again, the number of credits displayed reflects any changes in the adjustable locking limit due to either purchasing additional credits or expending credits for transfers.

Although FIG. 1 shows only a single credit processor 16 and independent certification processor 18, multiple credit processors and multiple independent certification processors may exist. If multiple credit processors and independent certification processors exist, each PC 10 preferably is informed of each address and selects the systems to contact randomly. In a preferred embodiment, each PC 10 contains a different subset of the addresses, thereby distributing the network traffic.

According to a preferred embodiment, even in the event of a transmission error, an error doctor enables files to be successfully sent. In order to achieve successful transmission, the control module operating at the sending personal computer partitions a group of files being transferred between personal computers into two discrete segments. Each discrete segment contains a portion of the files to be transferred. The partition occurs at the point where the transmission error occurred, the first segment having been successfully transmitted, the second segment having failed transmission.

The protocol used for transferring the files, e.g., TCP/IP, informs the sending PC of when the transfer was interrupted, i.e., when the connection was lost. After losing the connection, the sending PC establishes another connection and attempts to retransmit the entire group of files. However, the receiving PC immediately advises the sending PC that the last transfer was incomplete and informs the sending PC of the amount successfully received. In a preferred embodiment, the receiving PC subtracts a buffer amount from the amount actually received to compensate for any errors that may have occurred near the end of the interrupted transmission. The sending PC then calculates what portion of the group has not been sent, i.e., the second segment, and sends the second segment to the same receiving computer. Upon receipt, the receiving PC overwrites an amount equal to the buffer at the end of the first segment and then combines the two discrete segments into a single packet of compressed files without loss of file content. In the event of additional interruptions, the process repeats until the entire file is successfully received or until the sending PC stops trying to send the group of files. Typically, the sending PC stops sending when the sending PC encounters excessive errors.

Polling: See FIG. 13

The present invention is further directed to periodically polling connection status of destinations listed in the destination window. Connection status polling involves requesting a return of destination identifiers from all other recorded PCs in order to determine which PC destinations have active connections through which communication could be initiated. A visible indication may be provided which shows each active connection identified, thus notifying the user of which PC destinations are available for receiving a communication request.

Polling destinations for connection status is similar to pinging a remote site on a UNIX system. However, connection status polling is more sophisticated because it not only determines whether the site is active, but also determines that the identity of the site is indeed an intended recipient. The check for active IP connections routine shown in FIG. 13 updates the status of connections for destinations listed in the destination window, as well as the number of credits remaining.

Figure 13:
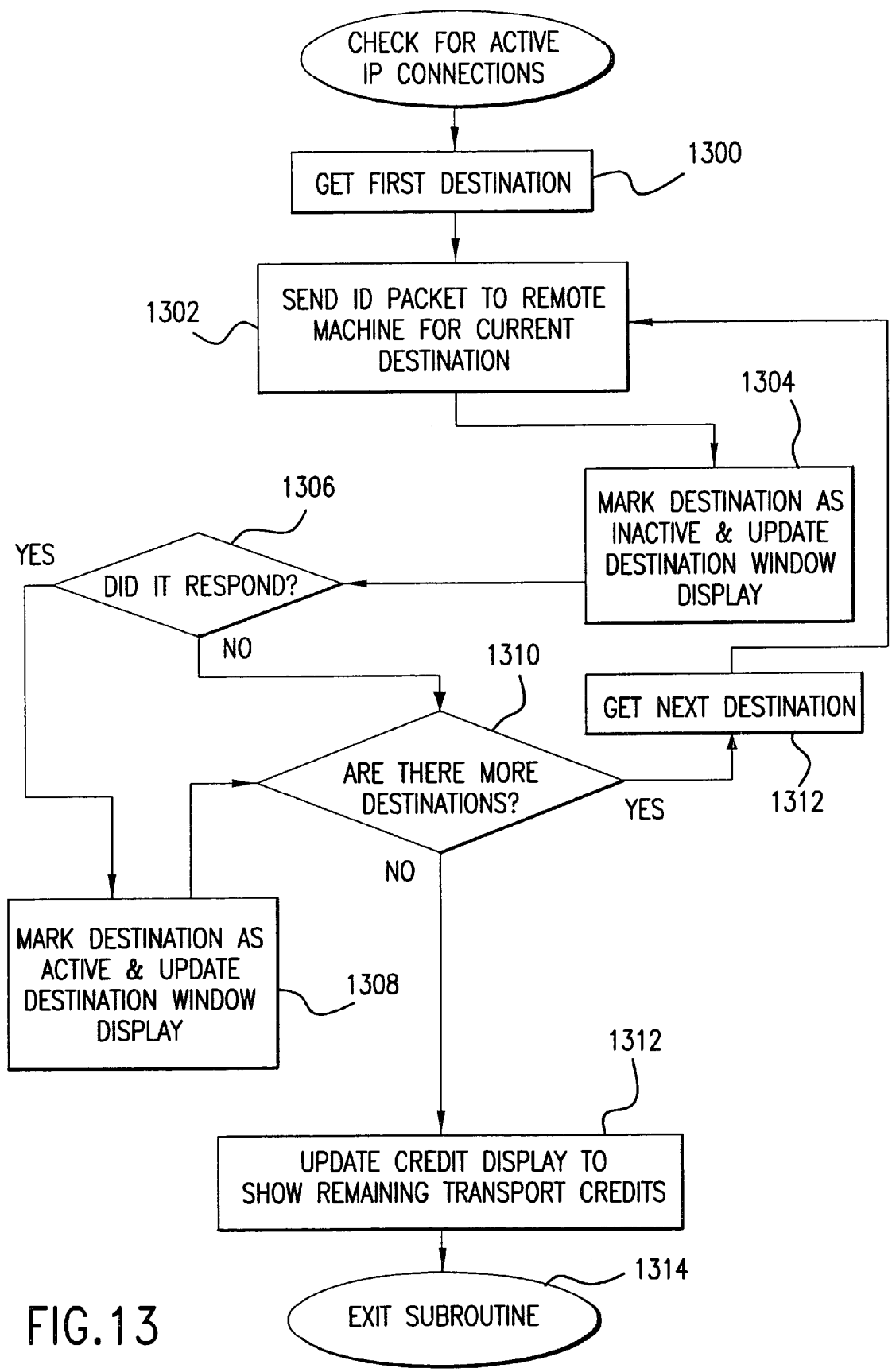
FIG. 13 is a flow diagram of exemplary logic for a check for active connections module which periodically checks for active connections for each address listed in the destination window, according to an aspect of the present invention.

Referring to FIG. 13, exemplary logic for executing the connection status polling process is now described. At step 1300 the logic determines the first destination in the destination bar. Then, at step 1302 an ID packet is sent to the address listed for the destination. At step 1304 the destination is marked as inactive and displayed accordingly, e.g., dimmed. At step 1306 it is determined whether a response was received from the destination. If a response was received the program compares the response to the station name, or other authenticator code word, to make sure it matches what is on file. If they agree, the destination is marked active and file transfers can ensue. Thus, at step 1308 the destination is marked as active and displayed accordingly. Subsequently, at step 1310 it is determined whether any other destinations have not been status polled. Similarly, if it is determined at step 1306 that no response has been received or there is no match, the ID packet is simply thrown out and the destination is left inactive, and at step 1310 it is determined whether any other destinations have not been status polled.

If any destinations have not been status polled, the next destination is determined at step 1312, and the logic returns to step 1302 and repeats for that destination. If at step 1310 it is determined that all destinations have been status polled, at step 1312 the credit display is updated to show the number of credits remaining. Subsequently, the process terminates at step 1314. According to a preferred embodiment, the status polling process repeats periodically, for example every 20 seconds. When a remote site receives the ID packet, the receive file module, at step 422, sends back the receiving PC's station name and any other required authentication data as established during setup, which might include authentication codes for example.

By way of example, a preferred embodiment of the present invention applied to an International Postal Service business model includes an unlimited numbers of service user computers having an active connection to a communications pathway, such as the Internet. Each computer runs the computer program of the present invention enabling direct, substantially simultaneous, parallel, encrypted transfer of files between one computer and any number of other computers. Electronic receipts are automatically generated and automatically returned to senders via a "trusted third party" certification processor, documenting files received at destination computers. File transport between senders and recipients is immediate and direct. Service users pay for file transport through a reduction of credits in a credit account located locally at each user computer, and credits are restored electronically in proportion to payments at specified currency rates, with both charges and restoration being in accordance with a service provider policy. File transport security is assured through robust user authentication and file encryption. For example, computers operating as the following service processors: (1) one or more credit request processors, (2) one or more return receipt certification processors, and/or (3)

one or more encryption/decryption key issuer, user authenticator or security policy management processors (hereafter, security server) are present, operating and available through an active connection to the communications pathway. The physical location of these processing computers is important only for security policy and service user payment reasons, however, physical security of the processors is required. These issues are resolved in accordance with service provider policy.

Eligibility for service use is gained through user identity authentication and registration in the security server. Access to service use is gained through installation and use of the computer program of the present invention. The computer program is obtained, for example, at the time of user registration. Service use consumes credits in the credit account stored in a user computer or on an external device (e.g., Smart Card obtained at registration). Continued service use over time requires replenishment of credits through automatic requests for credits submitted to a credit processor. Payment for credits issued is in accordance with the billing or collection procedures and systems of the service providers. Credit authorization is returned from a credit processor to a user computer over the communications pathway (i.e., Internet), and the user credits are replenished.

Depending on the preference of the service provider, public key encryption or one-time-pad encryption may be implemented. Files can be encrypted prior to transport using public keys for each destination obtained by each sender from the trusted third party security server. Alternatively, one-time-pads obtained automatically for each transaction between sender and recipient from the trusted third party security server can be used to encrypt files prior to transport. Encrypted files, along with authenticated user identity, and the "hash" ("electronic finger print") of the files being sent are transported directly between computers over the communications pathway (i.e., Internet), without passing through the processors or security server. Received files can be decrypted using the recipients private key if public key encryption is implemented. Alternatively, received files can be automatically decrypted if one-time-pad encryption is implemented and the recipient's identity and decryption request to the security server comply with implemented security policy. Various security service policies, such as station to station encryption or person to person encryption can be effected.

Completed file transport transactions are certified for the sender by a return receipt that is (1) generated by the computer program of the present invention installed on the file recipient's computer, (2) automatically transported over the Internet to the certification processor, (3) "postmarked" by the trusted third party (certification processor), and (4) automatically transported from the certification processor to the file sender's computer. The return receipt generated by the file recipient computer may contain a range of information such as date and time of file receipt, parties to the exchange by registered identity, an electronic finger print of the transported files (the hash), and characteristics of the files received. Upon certification of the return receipt by the trusted third party certification processor, a range of additional information can be added such as the date and time of certification, the date and time of encryption and decryption (obtained from the security server), and the certification "postmark" of the trusted third party certification authority.

Other implementations of various business models according to the present invention are considered. Contemplated systems include those wherein (1) large arrays of computers or computing devices transport files primarily to one or relatively few destination computers; (2) one or relatively few computers transport files to large arrays of computers or computing devices; and (3) at least some of the system functions of the present invention are implemented, enabling direct, substantially simultaneous, parallel, encrypted transfer of files between one computer and any number of other computers, and enabling generation of electronic receipts automatically directly returned or certified through a trusted third party and then returned to senders, thus documenting files received at destination computers.

Although the present specification describes components and functions implemented in the embodiments with reference to particular standards and protocols, the invention is not limited to such standards and protocols. For example TCP/IP and the Internet are referred to throughout this specification as representing examples of the state of the art. However, such standards are periodically superseded by faster and more efficient equivalents having essentially the same functions. Accordingly, replacement standards and protocols having the same functions are considered equivalents.

While the invention has been described with reference to several exemplary embodiments, it is understood that the words that have been used are words of description and illustration, rather than words of limitation. Changes may be made, within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses, such as are within the scope of the appended claims.

Computer Program

In greater detail, the following discloses the source code for the computer program of a preferred embodiment of the present invention that should be operating on both the sending PC and the receiving PC during the time communication is attempted in order to effect a file transfer. Other required operating conditions include active connection to a communications pathway; power on state at both the sending and the receiving PC; and a GUI operating system such as Microsoft Windows NT, Windows 95 or Windows 3.1x installed and operating on both the sending PC and the receiving PC.

What is claimed is:

1. A file authentication requesting device that stores a computer program for requesting third party authentication of files in digital systems, the device comprising:

a confirmation request device that processes at least one file to generate attributes and generates a request for a confirmation receipt from an authenticator device authenticating attributes of the at least one file;

a transferring device that transfers the generated attributes of the at least one file to be authenticated and an identification of at least one of the requesting device and a user of the requesting device to the authenticator device from the requesting device, the attributes comprising at least an electronic fingerprint of the at least one file; and a receiving device that receives the confirmation receipt comprising at least authenticated file attributes after an authentication by the authenticator device, the authentication comprising at least a unique digital characterization of the attributes;

wherein, at least one file authentication is received from the authenticator device in response to the request; and whereby the transferring device need not transfer the at least one file to the authenticator device to perform the authentication.

2. The file authentication requesting device of claim 1, in which the at least one file to be authenticated was received by the requesting device as a file transfer from another device.

3. The file authentication requesting device of claim 1, in which the authentication further comprises digitally signing the confirmation receipt.

4. The file authenticator requesting device of claim 1, in which the unique digital characterization of file attributes comprises authentication by a postal authority.

5. A file authenticator device that stores a computer program for processing requests for third party authentication of files in digital systems, the device comprising:
   a receiving device that receives attributes of at least one file to be authenticated and an identification of at least one of a requesting device and a user of the requesting device from the requesting device, the attributes generated by the requesting device processing the at least one file and the attributes comprising at least an electronic fingerprint of the at least one file;
   a processing device that processes a confirmation receipt, the processing comprising a unique digital characterization of the file attributes generated, assuring at least in part tampering and modification detection; and
   a sending device that creates a pending event for return of the confirmation receipt to the requesting device and sends the confirmation receipt comprising authenticated file attributes to the requesting device, after processing;
   wherein, at least one file is authenticated by the authenticator device; and
   whereby the receiving device need not receive the at least one file to perform the authentication.

6. The file authenticator device of claim 5, in which the unique digital characterization further comprises digitally signing at least one of the file attributes and the confirmation receipt.

7. The file authenticator device of claim 5, in which the confirmation receipt incorporates at least a date and a time of authentication, and an identification of at least the requesting device.

8. The file authenticator device of claim 5, in which the unique digital characterization of file attributes comprises authentication by a postal authority.

9. A file authentication system comprising:
   at least one file authentication requesting device processing at least one file to generate attributes and originating a request for a confirmation receipt from an authenticator device, and transferring the generated attributes of the at least one file to be authenticated and an identification of at least one of the requesting device and a user of the requesting device to the authenticator device;
   a confirmation request processing device to process a confirmation receipt by the authenticator device, the processing comprising a unique digital characterization of the file attributes generated, assuring at least in part tampering and modification detection; and
   a transferring device to transfer the confirmation receipt comprising authenticated file attributes, after processing by the authenticator device, the authentication comprising at least a unique digital characterization of the file attributes;
   wherein, the authenticator device authenticates the attributes of the at least one file; and
   whereby the authenticator device need not receive the at least one file to perform the authentication.

10. The file authentication system of claim 9, in which the unique digital characterization further comprises digitally signing at least one of the file attributes and the confirmation receipt.

11. The file authentication system of claim 9, in which the confirmation receipt incorporates at least a date and a time of authentication, and an identification of at least the requesting device.

12. The file authentication system of claim 9, in which the unique digital characterization of file attributes comprises authentication by a postal authority.

13. A computer readable medium that stores a computer program for third party authentication of files in digital systems, the medium comprising:
   a receiving source code segment with instructions for receiving attributes of at least one file to be authenticated and an identification of at least one of a requesting device and a user of the requesting device from the requesting device, the attributes generated by the requesting device processing at least one file and the attributes comprising at least an electronic fingerprint of the at least one file;
   a processing source code segment with instructions for processing a confirmation receipt, the processing comprising a unique digital characterization of the file attributes generated, assuring at least in part tampering and modification detection; and
   a sending source code segment with instructions for creating a pending event for return of the confirmation receipt to the requesting device and sending the confirmation receipt comprising at least authenticated file attributes to the requesting device, after processing;
   wherein, at least one file is authenticated by the authentication processing device; and
   whereby the receiving source code segment need not include instructions for receiving the at least one file to perform the authentication.

14. The medium of claim 13, in which the unique digital characterization further comprises digitally signing at least one of the file attributes and the confirmation receipt.

15. The medium of claim 13, in which the confirmation receipt incorporates at least a date and a time of authentication, and an identification of at least the requesting device.

16. The medium of claim 13, in which the unique digital characterization of file attributes comprises authentication by a postal authority.

17. A computer readable medium that stores a computer program for requesting third party authentication of files in digital systems, the medium comprising:
   a confirmation request source code segment with instructions for generating a request by a requesting device for a confirmation receipt from an authenticator device authenticating attributes of at least one file;
   a transferring source code segment with instructions for transferring the generated attributes of the at least one file to be authenticated and an identification of at least one of the requesting device and a user of the requesting device to the authenticator device from the requesting device, the attributes comprising at least an electronic fingerprint of the at least one file; and
   a receiving source code segment with instructions for receiving the confirmation receipt comprising at least authenticated file attributes after an authentication by the authenticator device, the authentication comprising at least a unique digital characterization of the attributes;
   wherein, at least one file authentication is received from the authenticator device in response to the request; and whereby the transferring source code segment need not transfer the at least one file to the authenticator device to perform the authentication.

18. The medium of claim 17, in which the at least one file to be authenticated was received by the requesting device as a file transfer from another device.

19. The medium of claim 17, in which the unique digital characterization further comprises digitally signing the confirmation receipt.

20. The medium of claim 17, in which the unique digital characterization of file attributes comprises authentication by a postal authority.

21. A method for third party authentication of files in digital systems, the method comprising:
- requesting at a requesting device a confirmation receipt from an authenticator device;
- transferring attributes of at least one file to be authenticated and an identification of at least one of a requesting device and a user of the requesting device to the authenticator device by the requesting device, the attributes generated by the requesting device processing at least one file and the attributes comprising at least an electronic fingerprint of the at least one file;
- processing the confirmation receipt by the authenticator device, the processing comprising a unique digital characterization of the file attributes generated, assuring at least in part tampering and modification detection;
- creating at the authenticator device a pending event for return of the confirmation receipt to the requesting device;
- sending the confirmation receipt comprising authenticated file attributes, after processing by the authenticator device, to the requesting device; and
- receiving at the requesting device at least one file authentication from the authenticator device;
- wherein the authenticator device authenticates the attributes of the at least one file as requested by the requesting device; and
- whereby the authenticator device need not receive the at least one file to perform the authentication.

22. The method of claim 21, in which the at least one file to be authenticated was received by the requesting device as a file transfer from another device.

23. The method of claim 21, in which the unique digital characterization further comprises digitally signing the confirmation receipt.

24. The method of claim 21, in which the confirmation receipt incorporates at least a date and a time of authentication, and an identification of at least the requesting device.

25. The method of claim 21, in which the unique digital characterization of file attributes comprises authentication by a postal authority.

* * * * *